(12) United States Patent
Reese et al.

(10) Patent No.: US 11,602,149 B2
(45) Date of Patent: Mar. 14, 2023

(54) FOOD PREPARATION APPARATUS AND METHODS

(71) Applicant: Duke Manufacturing Co., St. Louis, MO (US)

(72) Inventors: Robert J. Reese, Edwardsville, IL (US); Philip Gregory Geerling, St. Louis, MO (US); Jeffrey A. Stafford, Godfrey, IL (US); Gregory Glen Stettes, Pacific, MO (US); Thomas E. Kieffer, St. Louis, MO (US); Kim Charles Fietsam, New Athens, IL (US)

(73) Assignee: Duke Manufacturing Co., St. Louis, MO (US)

( * ) Notice: Subject to any disclaimer, the term of this patent is extended or adjusted under 35 U.S.C. 154(b) by 194 days.

(21) Appl. No.: 16/915,576

(22) Filed: Jun. 29, 2020

(65) Prior Publication Data
US 2020/0323222 A1 Oct. 15, 2020

Related U.S. Application Data

(63) Continuation of application No. 15/442,228, filed on Feb. 24, 2017, now Pat. No. 10,694,753, which is a
(Continued)

(51) Int. Cl.
A21B 1/40 (2006.01)
G05B 19/10 (2006.01)
(Continued)

(52) U.S. Cl.
CPC ............... *A21B 1/40* (2013.01); *A21B 3/00* (2013.01); *A21D 8/06* (2013.01); *F24C 7/08* (2013.01);
(Continued)

(58) Field of Classification Search
CPC .... A21B 3/00; A21B 1/40; A21D 8/06; F24C 7/08; F24C 15/327; G05B 19/106;
(Continued)

(56) References Cited

U.S. PATENT DOCUMENTS 2,502,172 A 3/1950 Paulsen
3,214,566 A 10/1965 Wilson
(Continued)

FOREIGN PATENT DOCUMENTS

CN 1942103 A 4/2007
DE 10245773 C1 4/2003
(Continued)

OTHER PUBLICATIONS

International Preliminary Report on Patentability in related PCT/US2014/039367 dated Dec. 3, 2015, 8 pages.
(Continued)

*Primary Examiner* — Brian W Jennison
(74) *Attorney, Agent, or Firm* — Stinson LLP

(57) ABSTRACT

Food preparation apparatus and associated methods. In one method, dough is proofed in an oven compartment and then baked in the same oven compartment. Temperature and/or humidity can be controlled during proofing and/or baking cycles. A blower may be used, for example, to exhaust gas to ambient to reduce heat and/or moisture in the compartment. For example, the blower may be used between proofing and baking cycles to prepare an environment in the oven compartment for the baking cycle.

21 Claims, 31 Drawing Sheets

Related U.S. Application Data continuation of application No. 14/947,130, filed on Nov. 20, 2015, now abandoned, which is a continuation of application No. PCT/US2014/039367, filed on May 23, 2014.

(60) Provisional application No. 61/826,849, filed on May 23, 2013.

(51) Int. Cl.

| | | |
|---|---|---|
| *F24C 7/08* | (2006.01) | |
| *F24C 15/32* | (2006.01) | |
| *A21B 3/00* | (2006.01) | |
| *G06F 3/0481* | (2022.01) | |
| *G06T 11/20* | (2006.01) | |
| *A21D 8/06* | (2006.01) | |
| *G06F 3/0482* | (2013.01) | |
| *G06F 3/04847* | (2022.01) | |
| *G06F 3/04886* | (2022.01) | |

(52) U.S. Cl.
CPC .......... *F24C 15/327* (2013.01); *G05B 19/106* (2013.01); *G06F 3/0481* (2013.01); *G06T 11/206* (2013.01); *G05B 2219/23121* (2013.01); *G05B 2219/23142* (2013.01); *G05B 2219/23159* (2013.01); *G05B 2219/23162* (2013.01); *G05B 2219/23168* (2013.01); *G05B 2219/23377* (2013.01); *G05B 2219/23427* (2013.01); *G05B 2219/2643* (2013.01); *G06F 3/0482* (2013.01); *G06F 3/04847* (2013.01); *G06F 3/04886* (2013.01)

(58) Field of Classification Search
CPC .......... G05B 2219/23121; G05B 2219/23142; G05B 2219/23159; G05B 2219/23162; G05B 2219/23168; G05B 2219/23377; G05B 2219/23427; G05B 2219/2643; G06F 3/0482; G06F 3/04847; G06F 3/04886
See application file for complete search history.

(56) References Cited

U.S. PATENT DOCUMENTS

| | | |
|---|---|---|
| 3,479,971 A | 11/1969 | Bender et al. |
| 3,518,949 A | 7/1970 | Stock |
| 4,026,616 A | 5/1977 | Kuehl |
| 4,162,381 A | 7/1979 | Buck |
| 4,179,985 A | 12/1979 | Baker et al. |
| 4,181,613 A | 1/1980 | Welsh et al. |
| 4,208,572 A | 6/1980 | Melgaard |
| 4,298,341 A | 11/1981 | Nowack |
| 4,309,584 A | 1/1982 | Terakami |
| 4,385,075 A | 5/1983 | Brooks |
| 4,415,799 A | 11/1983 | Tanaka et al. |
| 4,418,261 A | 11/1983 | Jailor et al. |
| 4,420,679 A | 12/1983 | Howe |
| 4,491,375 A | 1/1985 | Ugalde |
| 4,516,012 A | 5/1985 | Smith et al. |
| 4,587,946 A | 5/1986 | Doyon et al. |
| 4,674,402 A | 6/1987 | Raufeisen |
| 4,698,487 A | 10/1987 | Meister |
| 4,700,685 A | 10/1987 | Miller |
| 4,771,163 A | 9/1988 | Thiboutot |
| 4,813,398 A | 3/1989 | Savage |
| 4,817,582 A | 4/1989 | Oslin et al. |
| 4,851,644 A | 7/1989 | Oslin et al. |
| 4,884,626 A | 12/1989 | Filipowski |
| 4,914,277 A | 4/1990 | Guerin et al. |
| 4,924,072 A | 5/1990 | Oslin et al. |
| 5,072,666 A | 12/1991 | Hullstrung |
| 5,113,600 A | 5/1992 | Telchuk |
| 5,442,994 A | 8/1995 | Parker |
| 5,451,744 A | 9/1995 | Koopman et al. |
| 5,463,940 A | 11/1995 | Cataldo |
| 5,494,690 A | 2/1996 | Shelton |
| 5,525,782 A | 6/1996 | Yoneno et al. |
| 5,568,802 A | 10/1996 | Buday et al. |
| 5,619,983 A | 4/1997 | Smith |
| 5,786,568 A | 7/1998 | McKinney |
| 5,830,353 A | 11/1998 | Henderson |
| 5,877,477 A | 3/1999 | Petty et al. |
| 5,918,589 A | 7/1999 | Valle et al. |
| 5,958,271 A | 9/1999 | Westerberg et al. |
| 6,070,517 A | 6/2000 | Helm |
| 6,098,473 A | 8/2000 | Hafner |
| 6,113,966 A | 9/2000 | Belongia et al. |
| 6,196,113 B1 | 3/2001 | Tung |
| 6,203,423 B1 | 3/2001 | Craw et al. |
| 6,244,165 B1 | 6/2001 | Trumbley et al. |
| 6,273,970 B1 | 8/2001 | Kopeliovich et al. |
| 6,465,762 B1 | 10/2002 | Swayne et al. |
| 6,555,791 B2 | 4/2003 | Lubrina et al. |
| 6,564,699 B1 | 5/2003 | Vincente et al. |
| 6,564,792 B2 | 5/2003 | Bassoli et al. |
| 6,637,320 B2 | 10/2003 | Grandi |
| 6,656,036 B1 | 12/2003 | Quigley |
| 6,658,995 B1 | 12/2003 | DeYoung et al. |
| 6,723,970 B1 | 4/2004 | Whipple |
| 6,727,478 B2 | 4/2004 | Rael et al. |
| 6,730,880 B2 | 5/2004 | Smith et al. |
| 6,766,267 B2 | 7/2004 | Floyd et al. |
| 6,831,254 B2 | 12/2004 | Barritt |
| 6,847,013 B2 | 1/2005 | Audette et al. |
| 6,854,457 B2 | 2/2005 | Rabas et al. |
| 6,862,494 B2 | 3/2005 | Hu et al. |
| 6,936,794 B2 | 8/2005 | Zhang et al. |
| 6,943,321 B2 | 9/2005 | Carbone et al. |
| 6,943,324 B2 | 9/2005 | Ahuja |
| 6,987,246 B2 | 1/2006 | Hansen et al. |
| 7,060,940 B2 | 6/2006 | Kim et al. |
| 7,092,988 B1 | 8/2006 | Bogatin et al. |
| 7,102,105 B2 | 9/2006 | Oh |
| 7,117,937 B2 | 10/2006 | Clark et al. |
| 7,141,258 B2 | 11/2006 | Hillmann |
| 7,188,481 B2 | 3/2007 | DeYoe et al. |
| 7,193,185 B2 | 3/2007 | Fisher |
| 7,223,943 B2 | 5/2007 | Kohlstrung et al. |
| 7,249,356 B1 | 7/2007 | Wilson et al. |
| 7,325,481 B2 | 2/2008 | Helm |
| 7,368,683 B2 | 5/2008 | Kim et al. |
| 7,378,620 B2 * | 5/2008 | Lubrina .................. F24C 7/085 219/505 |
| 7,461,588 B2 | 12/2008 | Head |
| 7,488,919 B2 | 2/2009 | Gagas et al. |
| 7,610,864 B2 | 11/2009 | LaMarche, II et al. |
| 7,634,992 B2 | 12/2009 | Bujeau et al. |
| 7,699,237 B2 | 4/2010 | Berkenkoetter et al. |
| 7,704,535 B2 | 4/2010 | Zhang et al. |
| 7,705,274 B2 | 4/2010 | Andoh et al. |
| 7,787,964 B2 | 8/2010 | Schuette et al. |
| 7,823,626 B2 | 11/2010 | Mueller et al. |
| 7,867,534 B2 | 1/2011 | Sells et al. |
| 7,875,834 B2 | 1/2011 | Bujeau et al. |
| 8,006,685 B2 | 8/2011 | Bolton et al. |
| 8,042,532 B2 | 10/2011 | Kaneko et al. |
| 8,087,407 B2 * | 1/2012 | Wiker ...................... A21B 1/40 99/336 |
| 8,193,470 B1 | 6/2012 | Harlamert |
| 8,378,265 B2 | 2/2013 | Greenwood et al. |
| 8,399,812 B2 | 3/2013 | Thorneywork et al. |
| 8,555,206 B2 | 10/2013 | Pederson et al. |
| 8,600,539 B2 | 12/2013 | Yoneda |
| 8,612,042 B2 | 12/2013 | Pettus et al. |
| 8,616,026 B2 | 12/2013 | Yoon et al. |
| 8,674,270 B2 | 3/2014 | Anderson et al. |
| 8,783,051 B2 | 7/2014 | Kundapur |
| 8,851,061 B2 | 10/2014 | Johnson |
| 9,157,640 B2 | 10/2015 | Distaso et al. |
| 9,357,787 B2 | 6/2016 | Deming et al. |
| 9,936,706 B2 | 4/2018 | Deming et al. |

(56) References Cited

U.S. PATENT DOCUMENTS

| | | |
|---|---|---|
| 2002/0105355 A1 | 8/2002 | Floyd et al. |
| 2002/0179588 A1 | 12/2002 | Lubrina et al. |
| 2003/0139843 A1 | 7/2003 | Hu et al. |
| 2003/0146205 A1 | 8/2003 | Rael et al. |
| 2003/0173352 A1 | 9/2003 | Patterson et al. |
| 2003/0211215 A1 | 11/2003 | Correll et al. |
| 2004/0131741 A1 | 7/2004 | Guilfoyle et al. |
| 2004/0200082 A1 | 10/2004 | Ahuja |
| 2004/0200827 A1 | 10/2004 | Bennett et al. |
| 2004/0261632 A1 | 12/2004 | Hansen et al. |
| 2004/0267382 A1 | 12/2004 | Cunningham et al. |
| 2005/0051529 A1 | 3/2005 | Day et al. |
| 2005/0074534 A1 | 4/2005 | Goedeken et al. |
| 2005/0103466 A1 | 5/2005 | Landry et al. |
| 2005/0202126 A1 | 9/2005 | Zhang et al. |
| 2005/0212233 A1 | 9/2005 | Hall |
| 2006/0043087 A1 | 3/2006 | Gagas |
| 2006/0137675 A1 | 6/2006 | Kim |
| 2006/0233929 A1 | 10/2006 | Sanders et al. |
| 2006/0266229 A1* | 11/2006 | Ribich .............. A23N 12/12 99/486 |
| 2007/0158335 A1 | 7/2007 | Mansbery |
| 2007/0233284 A1 | 10/2007 | Schuette et al. |
| 2008/0110875 A1* | 5/2008 | Fisher .............. F24C 7/082 219/483 |
| 2008/0149088 A1 | 6/2008 | Inada et al. |
| 2008/0171120 A1 | 7/2008 | Willett |
| 2008/0229936 A1 | 9/2008 | Kaneko |
| 2008/0236404 A1 | 10/2008 | Ose et al. |
| 2009/0018692 A1 | 1/2009 | Yoneda |
| 2009/0164933 A1 | 6/2009 | Pederson et al. |
| 2010/0139641 A1 | 6/2010 | Distaso |
| 2010/0196561 A1 | 8/2010 | Kling et al. |
| 2010/0203193 A1 | 8/2010 | Zhang et al. |
| 2010/0282097 A1 | 11/2010 | Schulte |
| 2010/0301034 A1 | 12/2010 | Greenwood et al. |
| 2011/0132346 A1 | 6/2011 | Sakane et al. |
| 2011/0151072 A1 | 6/2011 | Anderson et al. |
| 2011/0168690 A1 | 7/2011 | Tomomura et al. |
| 2011/0210144 A1 | 9/2011 | Lauer |
| 2011/0278279 A1 | 11/2011 | Giazzon et al. |
| 2012/0003364 A1 | 1/2012 | Kling et al. |
| 2012/0074121 A1 | 3/2012 | Gagas |
| 2012/0152223 A1 | 6/2012 | Sillmen et al. |
| 2012/0294992 A1* | 11/2012 | Sager .............. F24C 15/327 99/331 |
| 2013/0036918 A1 | 2/2013 | Sakane |
| 2013/0053996 A1* | 2/2013 | Wu .............. G05B 19/41865 700/100 |
| 2013/0092145 A1 | 4/2013 | Murphy et al. |
| 2013/0152913 A1 | 6/2013 | Raghavan et al. |
| 2013/0156906 A1 | 6/2013 | Raghavan et al. |
| 2013/0156913 A1 | 6/2013 | Raghaven et al. |
| 2013/0243923 A1 | 9/2013 | Greenwood et al. |
| 2013/0255655 A1 | 10/2013 | Johnson |
| 2013/0277353 A1 | 10/2013 | Joseph et al. |
| 2013/0284161 A1 | 10/2013 | Johnson |
| 2013/0333684 A1 | 12/2013 | Cescot et al. |
| 2014/0020670 A1 | 1/2014 | Lee et al. |
| 2014/0040830 A1 | 2/2014 | Montanye et al. |
| 2014/0048058 A1 | 2/2014 | Donarski |
| 2014/0083309 A1 | 3/2014 | Reese et al. |
| 2014/0094946 A1 | 4/2014 | Pettus et al. |
| 2014/0116267 A1 | 5/2014 | Hochschild et al. |
| 2015/0000429 A1 | 1/2015 | Deming et al. |
| 2016/0025351 A1 | 1/2016 | Koos et al. |
| 2016/0050940 A1 | 2/2016 | Gomez Jimenez et al. |
| 2016/0174574 A1 | 6/2016 | Deming et al. |
| 2017/0127686 A1 | 5/2017 | Deming et al. |

FOREIGN PATENT DOCUMENTS

| | | |
|---|---|---|
| DE | 10236961 A1 | 2/2004 |
| DE | 102007023767 A1 | 11/2008 |
| DE | 102010036639 A1 | 2/2012 |
| EP | 0732549 A2 | 9/1996 |
| EP | 0959305 A2 | 11/1999 |
| EP | 1209420 A1 | 5/2002 |
| EP | 2083223 A1 | 7/2009 |
| EP | 2187133 A2 | 5/2010 |
| EP | 2417880 A1 | 2/2012 |
| EP | 2466211 A1 | 6/2012 |
| EP | 2472187 A | 7/2012 |
| EP | 2681490 B1 | 1/2014 |
| EP | 2687787 A2 | 1/2014 |
| EP | 2786659 A1 | 10/2014 |
| FR | 2797682 A1 | 2/2001 |
| FR | 2975871 A1 | 12/2012 |
| GB | 1233256 A | 5/1971 |
| GB | 2258126 A | 1/1993 |
| JP | H02249446 A | 10/1990 |
| JP | H09264541 A | 10/1997 |
| JP | 10215754 A | 8/1998 |
| JP | H11155469 A | 6/1999 |
| JP | 2000193356 A | 7/2000 |
| JP | 2000314579 A | 11/2000 |
| JP | 2004097068 A | 4/2004 |
| JP | 2006220359 A | 8/2006 |
| JP | 2006288295 A | 10/2006 |
| JP | 2008199935 A | 9/2008 |
| JP | 2009240203 A | 10/2009 |
| JP | 2011027273 A | 2/2011 |
| JP | 6313563 B2 | 4/2015 |
| KR | 20130069697 A | 6/2013 |
| WO | 9213456 | 8/1992 |
| WO | 2006051409 A1 | 5/2006 |
| WO | 2006085317 | 8/2006 |
| WO | 2011004317 A1 | 1/2011 |
| WO | 2011026819 A2 | 3/2011 |
| WO | 2012112704 A2 | 8/2012 |
| WO | 2012117100 A2 | 9/2012 |
| WO | 2014190274 A1 | 11/2014 |
| WO | 2015/002678 A1 | 1/2015 |
| WO | 2015164875 A1 | 12/2015 |

OTHER PUBLICATIONS

International Search Report in related PCT/US15/27815 dated Sep. 30, 2015, 4 pages.
Written Opinion in related PCT/US15/27815 dated Sep. 30, 2015, 8 pages.
Written Opinion in related PCT/US2014/039367 dated Sep. 30, 2014, 6 pages.
International Search Report in related PCT/US2014/039367 dated Sep. 30, 2014, 3 pages.
Search Report in related European Application 14801265.1 dated Feb. 28, 2017, 10 pages.

* cited by examiner

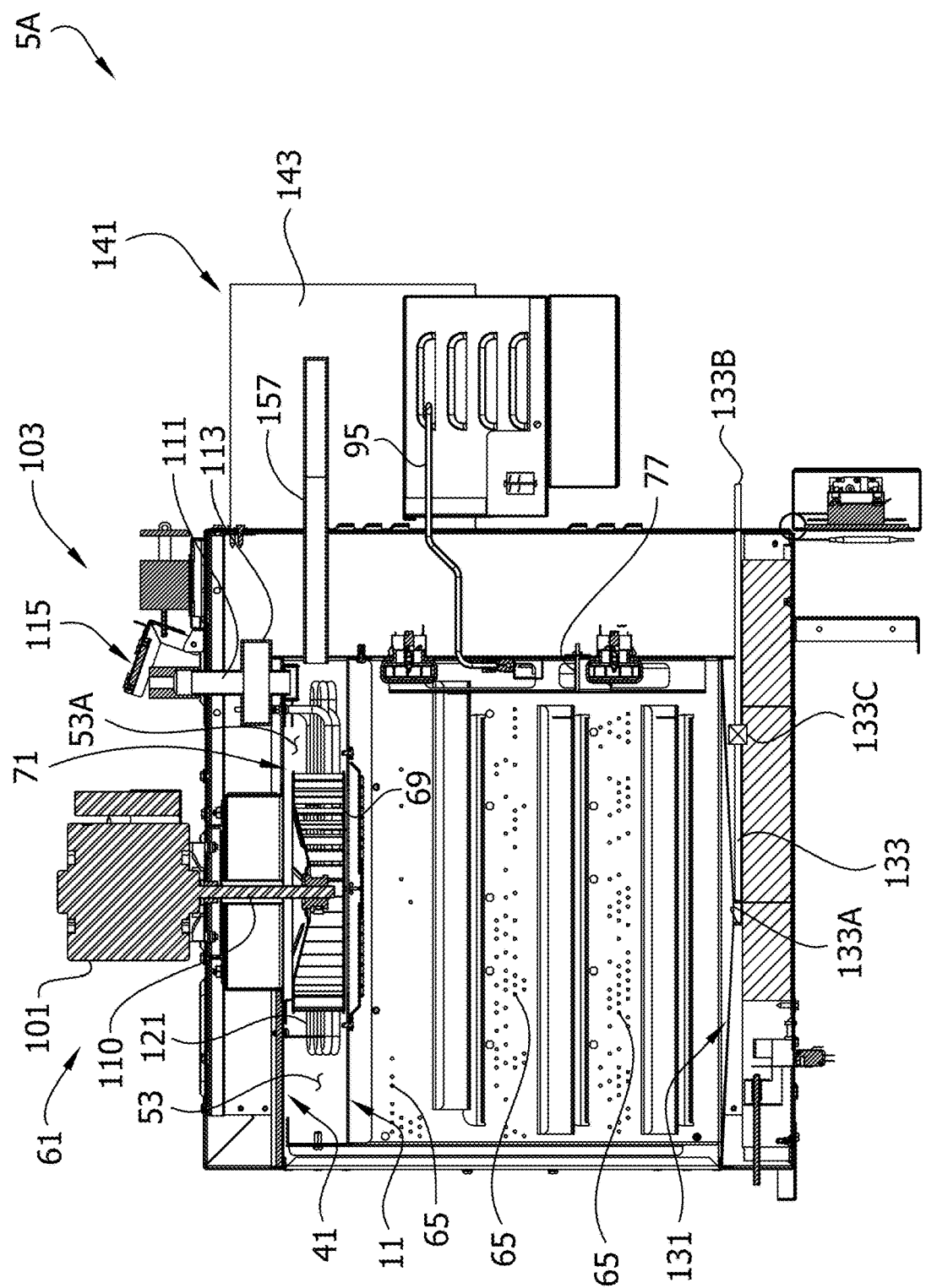

FOOD PREPARATION APPARATUS AND METHODS

CROSS-REFERENCE TO RELATED APPLICATIONS

The present application is a continuation of U.S. patent application Ser. No. 15/442,228 filed Feb. 24, 2017, which is a continuation of U.S. patent application Ser. No. 14/947,130, filed Nov. 20, 2015, which is a continuation of PCT Patent Application No. PCT/US2014/039367, filed May 23, 2014, which claims priority to U.S. Provisional Patent Application No. 61/826,849, filed May 23, 2013, each of which is hereby incorporated by reference in its entirety.

FIELD OF THE DISCLOSURE

The present disclosure generally relates to recipe-implementing apparatus and more particularly to apparatus for preparing food, such as an oven, and associated user interfaces and methods.

BACKGROUND

Certain types of food products are especially difficult to cook quickly and uniformly. Bread is one such product. Retarding, proofing, and baking are three operations commonly used in bread making to achieve desired bread characteristics. As known in the field of baking, "retarding" dough causes a slower fermentation, or "rise," of the dough. Dough may be retarded to increase the flavor of the bread when baked and to give the crust a darker color. For example, frozen dough may be kept in a refrigerator overnight to retard it. After the dough is retarded, it may be proofed before baking. "Proofing" is a continuation of the process of yeast fermentation which increases the volume or "rise" of the shaped dough, and an oven used to "proof" bread is often referred to as a "proofer" or "proofer oven." After the dough is proofed, it may be removed from the proofer and then baked into bread. For example, an oven may include separate proofing and baking cavities such that the dough may be proofed in the proofer cavity before being moved to and baked in the baking cavity. Retarding, proofing, and baking recipes may include various operations such as temperature control, relative humidity control, and air circulation.

SUMMARY

In one aspect, a method of baking bread includes receiving a dough within a baking compartment of an oven. The method includes controlling temperature and humidity in the baking compartment according to a dough proofing recipe to proof the dough in the baking compartment by causing the dough to rise. Controlling the temperature includes operating a first blower to move gas into the baking compartment and operating at least one heating element to heat the gas. After at least partially proofing the dough in the baking compartment, gas is actively exhausted from the baking compartment out a vent of the oven to ambient by operating a second blower different than the first blower. Actively exhausting gas from the baking compartment causes humidity in the baking compartment to reduce. The method includes controlling temperature and humidity in the baking compartment according to a baking recipe to bake the dough into bread. Controlling the temperature includes operating the first blower to move gas into the baking compartment and operating the at least one heating element to heat the gas.

In another aspect, a method of baking a food product includes receiving an unrisen food product within a baking compartment of a baking device. The unrisen food product is allowed to rest within the baking compartment for a time to allow the unrisen food product to rise. A secondary blower is operated to move gas from the baking compartment to ambient after the time to allow the unrisen food product to rise is complete. The method includes heating the baking compartment to bake the food product.

Other objects and features will be in part apparent and in part pointed out hereinafter.

BRIEF DESCRIPTION OF THE DRAWINGS

FIG. 4 is a section of the upper section taken lengthwise with respect to the upper section;

DETAILED DESCRIPTION

Figure 1:
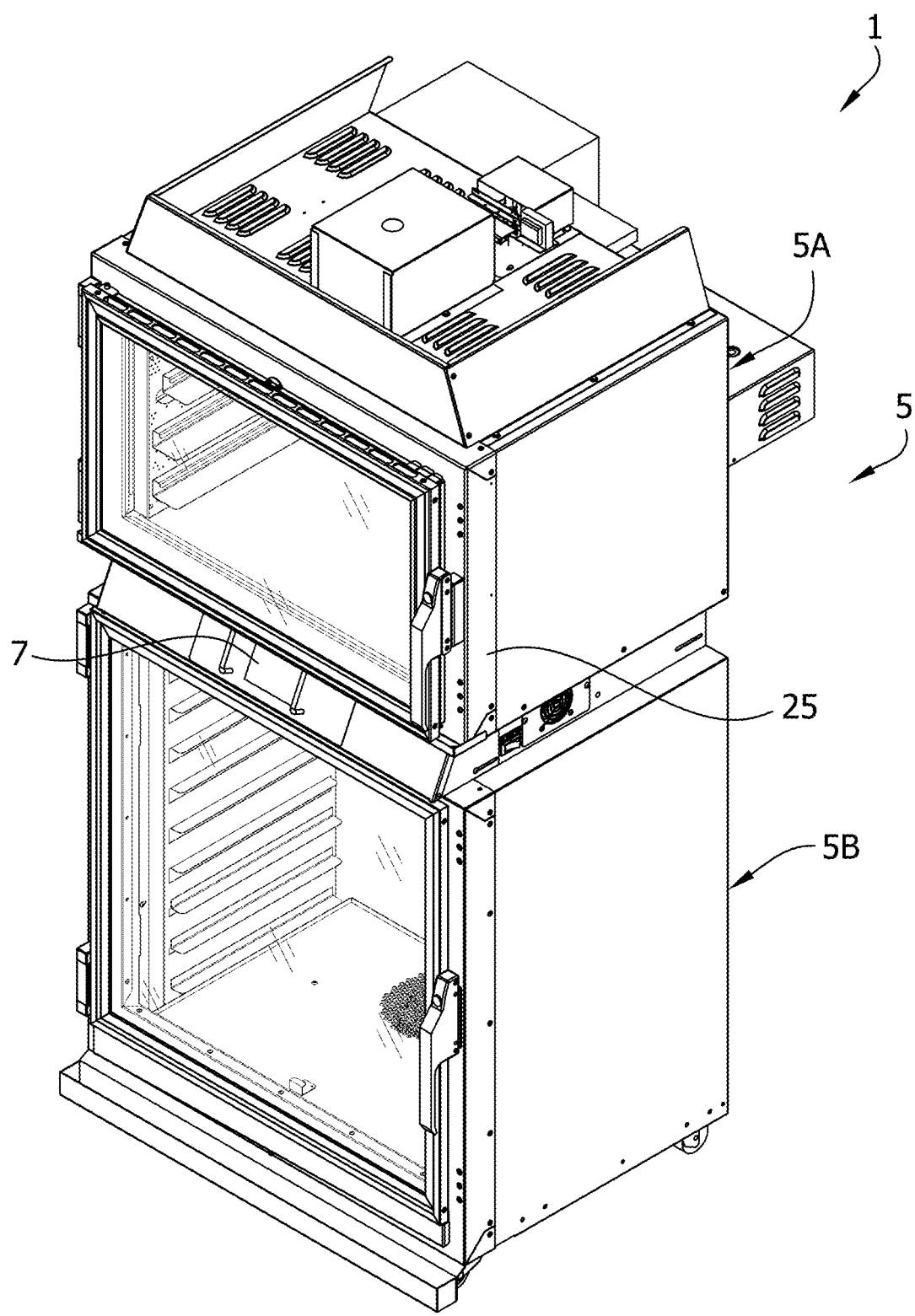
FIG. 1 is a perspective of an oven of the present invention.

Referring to the drawings, FIG. 1 illustrates one embodiment of an oven (broadly "food preparation apparatus") according to the present invention, indicated generally by the reference number 1. The oven 1 may be used for cooking or baking food products, such as bread, among other things. As will become apparent, the oven 1 has customizable, independently programmable parameters permitting precise tailoring and testing of various recipes for retarding, proofing, and/or baking dough.

The oven 1 illustrated in FIG. 1 includes a cabinet, generally designated by the reference number 5, having an upper section 5A and a lower section 5B. The oven 1 includes a user interface 7 positioned between the upper and lower sections 5A, 5B for controlling oven operation. The upper section 5A is adapted for retarding, proofing, and/or baking dough. The upper section 5A will be described in further detail hereafter, with the understanding that the lower section 5B can include its own components or components shared with the upper section configured for executing the same or different operations in the lower section as in the upper section, using a shared controller or separate controllers. Both of the sections 5A and 5B may be configured for retarding, proofing, and/or baking dough, or any combination thereof. Alternatively, for example, the lower section 5B may be adapted for retarding and/or proofing, and the upper section 5A may be adapted for proofing and/or baking. Other configurations may be used without departing from the scope of the present invention. Moreover, the cabinet 5 may include more (e.g., three, four, etc.) or fewer (e.g., one) sections without departing from the scope of the present invention. For example, the oven may comprise a single chamber (e.g., sized for receiving about 10 pans) without departing from the scope of the present invention.

Figure 2:
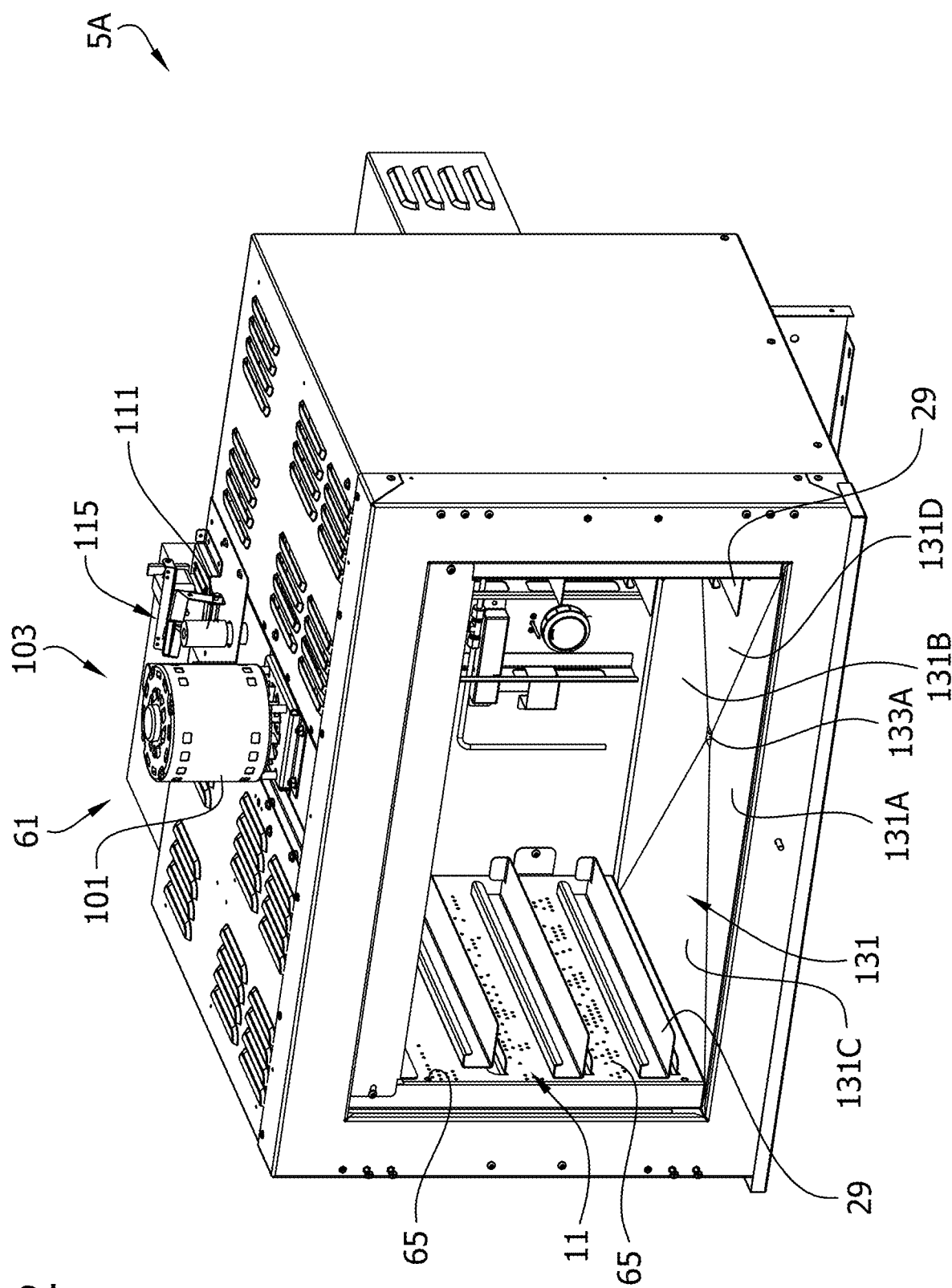
FIG. 2 is a perspective of an upper section of the oven, shrouds and covers of the upper section not being shown.
Figure 3:
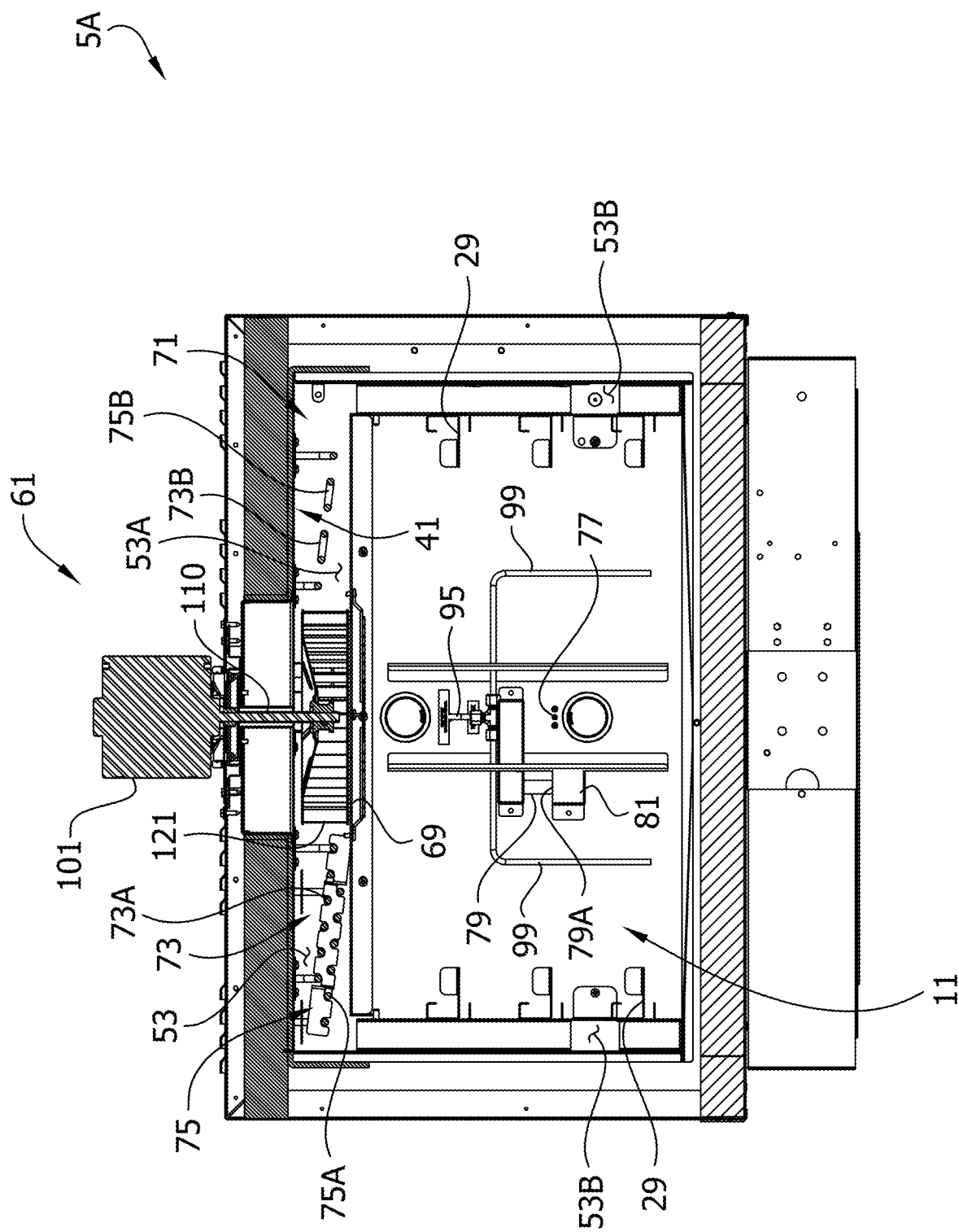
FIG. 3 is a section of the upper section of FIG. 1 taken widthwise with respect to the upper section.

Referring to FIGS. 2-5, the upper section 5A is shown separated from the lower section 5B and having covers, shrouds, and other parts removed to expose various components. As shown in FIGS. 2 and 3, the upper section 5A comprises a chamber 11 defined by a top wall, a bottom wall, opposite side walls, and a back wall. The chamber 11 is accessible by opening a door 25 which closes the front of the chamber. The door 25 is shown in FIG. 1 but is removed from the upper section 5A in the remainder of the figures. One or more rack supports 29 are secured to the side walls of the chamber 11 for supporting a number of food racks (not shown) in the chamber. Each rack is sized to hold a number of pans of bread dough. It will be understood that the number and size of the racks can vary without departing from the scope of this invention. The chamber houses food placed therein in a food preparation environment that can be controlled by one or more food preparation environment control devices, described in more detail below, to, for example, change the temperature, humidity, air flow, and/or venting of the food preparation environment. The chamber 11 is surrounded by an upper housing, generally designated 41 in FIG. 3, having a top wall, a bottom wall, opposite side walls, and a back wall. The top and side walls of the housing 41 are spaced from respective walls of the cooking chamber 11 to provide a conduit system or flow path 53 for circulating air (or other gas) to, through and from the cooking chamber 11. As shown in FIG. 3, the conduit system 53 comprises an upper portion 53A above the cooking chamber 11 and side portions 53B at opposite sides of the cooking chamber 11. Other flow path configurations may be used without departing from the scope of the present invention.

A blower, generally indicated at 61 in FIG. 3, (broadly "food preparation environment control device") is mounted in the upper portion 53A of the conduit system 53, adjacent the top of the upper section 5A of the oven, for circulating air (or other gas) through the conduit system. In the illustrated embodiment, air enters the cooking chamber 11 through a plurality of entry openings 65 in the side walls of the chamber (see FIGS. 2 and 4) and exits the chamber through an exhaust opening 69 in the top wall of the chamber below the blower 61. The blower 61 comprises a blower motor 101 and a blower wheel 121. The blower motor 101 is mounted on a top wall of the oven. The blower motor 101 drives rotation of the blower wheel 121 via output shaft 110, which rotates in a bearing about a generally vertical axis. The blower wheel 121 is located in the upper portion 53A of the air conduit system 53 adjacent (e.g., immediately above) the exhaust opening 69 in the top wall of the cooking chamber 11. The blower motor 101 is operable to rotate the blower wheel 121 to circulate air through the conduit system 53 and cooking chamber 11 at velocities and flow rates suitable for retarding, proofing, and/or baking dough. Exemplary velocities include 0-600 ft/min. The blower motor 101 may rotate the blower wheel 121 in constant or pulsed manners (e.g., blower energized for time periods separated by time periods of the blower not being energized), as needed. Rotation of the blower wheel 121 creates suction at the suction side of the blower wheel (i.e., the lower portion of the blower wheel adjacent the exhaust opening 69) to pull gas from the cooking chamber 11 through the exhaust opening 69. Gas is expelled from the blower wheel 121 at the output (exhaust) side of the blower wheel (i.e., the left and right sides of the blower wheel as shown in FIG. 3) to circulate air through the conduit system 53 to the cooking chamber 11. The blower 61 may be a variable-speed, reversible blower. More specifically, the blower motor 101 may be adapted to rotate the blower wheel 121 at variable rates and may be adapted to rotate the blower wheel in forward and reverse directions. Such a blower is disclosed in further detail in U.S. Pat. No. 8,378,265, which is hereby incorporated by reference in its entirety. For example, the oven 1 may be programmed to operate the blower 61 at different speeds for different recipes (e.g., faster or slower for bread recipe as compared to cookie recipe).

A heating system 71 (broadly "food preparation environment control device") is provided for heating the air being circulated. The heating system 71 heats the air in the conduit system 53 after it leaves the chamber 11 and before it is re-circulated back to the chamber via the conduit system. By way of example, the heating system 71 may comprise one or more electric resistance heating elements in the upper portion 53A of the conduit system 53 located adjacent the top wall of the chamber 11. In the illustrated embodiment, the heating system 71 includes a primary heater 73 including first and second heating elements 73A, 73B on opposite sides of the blower wheel 121 and a secondary or auxiliary heater 75 including third and fourth heating elements 75A, 75B on opposite sides of the blower wheel adjacent the first and second heating elements, respectively. Other forms of primary and auxiliary heaters may be used without departing from the scope of the present invention. As will become apparent, the heaters 73, 75 may be operated at the same or different times, for the same or different durations, and/or at the same or different duty cycles. For example, the primary heater 73 may be operated as the main heater for heating the circulating air, and the auxiliary heater 75 may be used at times when it is desired to rapidly increase the temperature of the circulating air (e.g., during pre-heat, temperature ramp up to start of bake recipe, etc.). The auxiliary heater 75 may be programmable to operate at duty cycles ranging from 0-100 percent at 1 percent increments. Other heating system configurations may be used without departing from the scope of the present invention. For example, the auxiliary heater 75 may be omitted. Variations in heat output may be achieved by varying the duty cycle of the primary heater 73. For high heat output, the duty cycle may be increased, and for lower heat output, the duty cycle may be decreased. For example, the duty cycle for the primary heater 73 may be programmed differently for different recipes (e.g., higher duty cycle and thus higher heat for ciabatta bread bake recipe than bake recipes for other types of bread). The auxiliary heater 75 and/or higher duty cycle of the primary heater 73 may be used for rapid recovery to temperature set point following a loss of temperature in the chamber 11 due to a door cycle open/close or food loading.

The oven 1 may include various sensors for indicating to control system of the oven relevant aspects of the retarding, proofing, and/or baking operations. For example, a temperature sensor 77 (FIGS. 3 and 4) is provided in the chamber 11 for sensing the temperature in the chamber and indicating the sensed temperature to a control system of the oven. A relative humidity sensor 79 is provided in the chamber 11 for sensing and communicating to the control system the relative humidity in the chamber. In the illustrated embodiment, the head or tip 79A of the humidity sensor is covered by a shield 81 to shield it from direct flow of a steam injection system, described in further detail below, to prevent artificially high relative humidity readings. The chamber 11 is selectively illuminated by lights 83 mounted on the back wall of the chamber 11.

Figure 5:
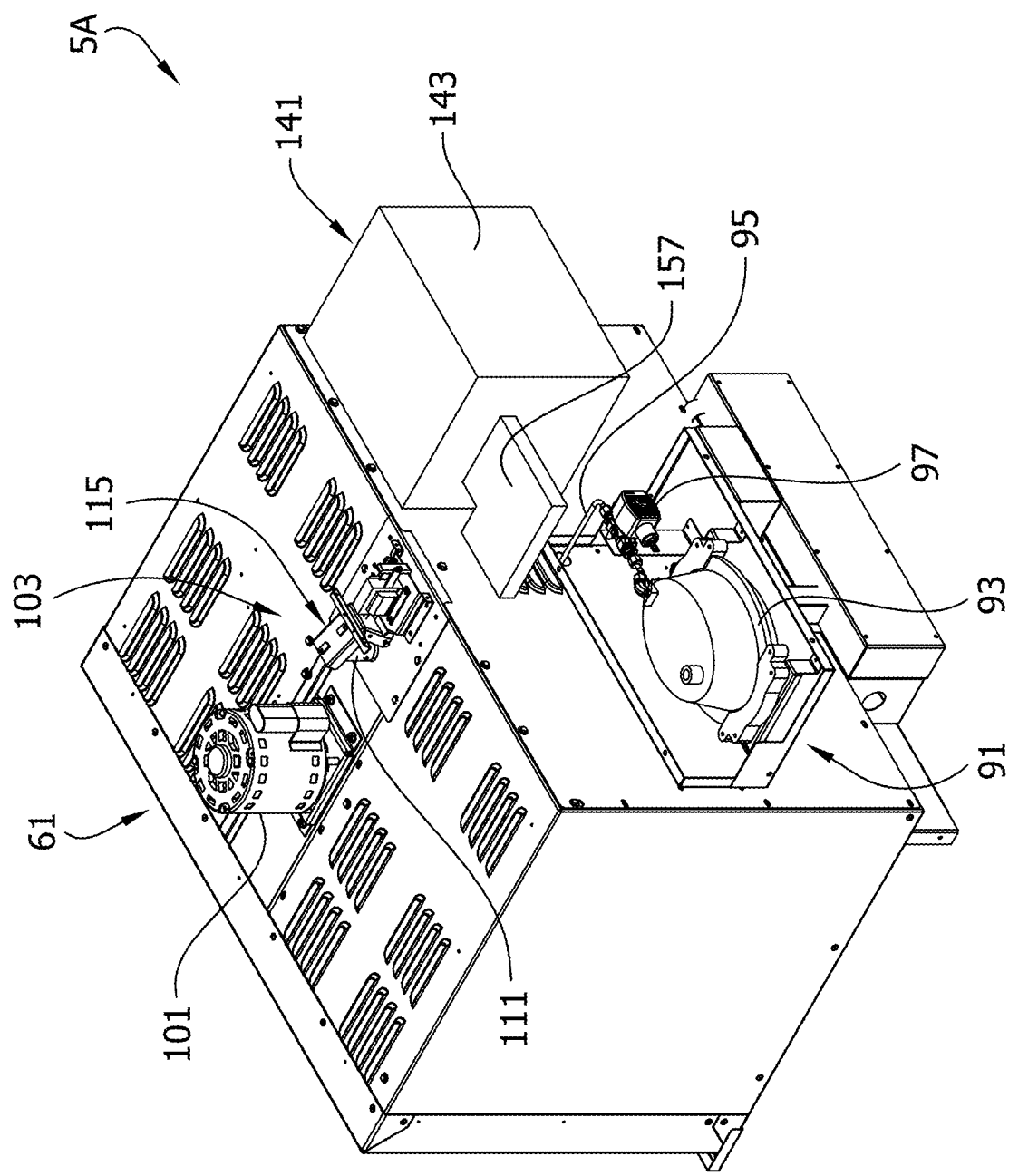
FIG. 5 is a rear perspective of the upper section.

Referring to FIG. 5, the oven 1 includes a steam injection system or humidification system, generally indicated by the reference number 91, (broadly "food preparation environment control device") adapted for introducing steam into the chamber 11. As explained in further detail below, the steam injection system 91 may be used in operations such as bread baking to improve the color, texture, or crunchiness of the crust of the baked bread. For example, steam may be injected in the chamber 11 at the beginning of a bake recipe, after the beginning of a bake recipe, and/or intermittently during a bake recipe. Condensation of the steam on the outside or "skin" of the bread and subsequent baking may provide the desirable characteristics noted above. Moreover, the steam injection system 91 may be used in controlling the humidity in the chamber 11 during recipes calling for humidity (e.g., during a proof recipe).

The steam injection system 91 includes a source of steam 93 supported on the oven 1 and a steam delivery conduit 95 extending between the source of steam and the chamber 11. In the illustrated embodiment, the source of steam 93 is a steam generator vessel which generates and holds a supply of steam in a reservoir. A solenoid valve 97 is positioned downstream from the steam generator 93 and upstream from the chamber 11 for selectively permitting steam injection into the chamber. The solenoid valve 97 has an open position in which it permits steam to enter the chamber 11 and a closed position in which it blocks steam from entering the chamber. As shown in FIG. 3, the steam delivery conduit 95 extends from behind the chamber 11 into the rear of the chamber, where the conduit is connected to two steam distribution conduits 99 that extend outwardly and downwardly inside the chamber along its rear wall. Steam is introduced into the chamber 11 through the ends of the steam distribution conduits 99. Other sources of steam, other steam delivery and distribution conduits, and other valves may be used without departing from the scope of the present invention. For example, the steam delivery conduits 99 may be arranged to distribute steam more evenly in the chamber to the various tray levels. Moreover, components of the steam injection system 91, such as the valve 93, may be omitted without departing from the scope of the present invention. For example, the source of steam 93 may produce steam "on demand" such that a valve is not required. When steam is needed, the steam is generated. An amount of water needed to produce the desired amount of steam may be introduced into the steam generator when called for by the control system such that a valve is not required to prevent excess steam from entering the chamber 11. As another example, steam may be generated by introducing water onto the blower 61, such as disclosed in U.S. Pat. No. 8,378,265, which is hereby incorporated by reference in its entirety.

Figure 3A:
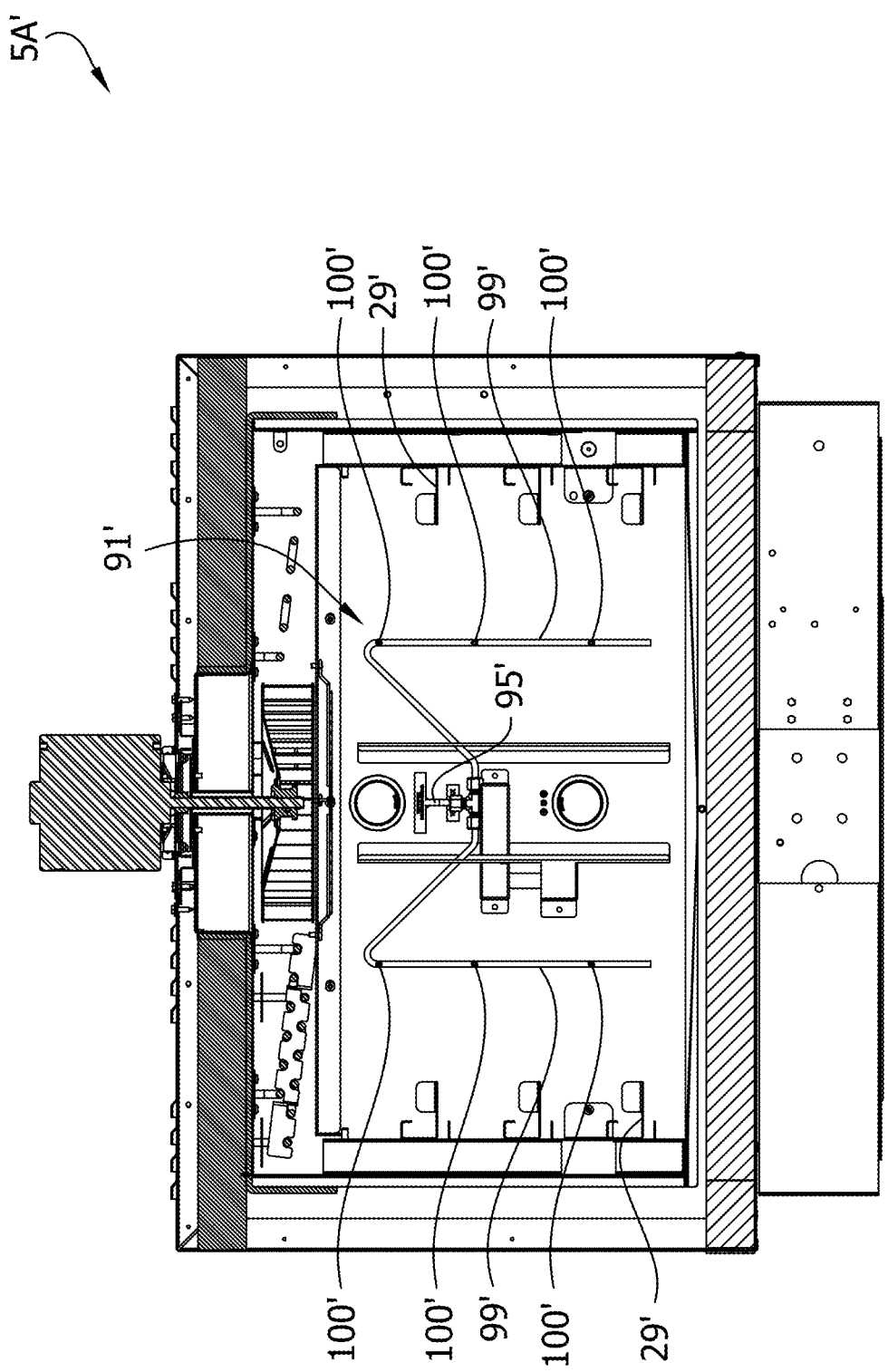
FIG. 3A is a view similar to FIG. 3 but showing an alternative embodiment of a steam injection system.

As shown in an alternative embodiment, illustrated in FIG. 3A, the steam injection system 91' may include steam outlet portions (e.g., one or more holes 100') positioned for delivering steam above each of the trays when held by the tray supports 29'. The injection system 91' includes a steam delivery conduit 95' and steam distribution conduits 99' having steam outlet openings 100' positioned above each set of rack supports 29' for introducing steam to the region above each of the trays. The number of steam outlet portions corresponds generally to the number of levels of rack supports 29', and the vertical position of the steam outlet portions is offset above respective tray supports 29' for delivering steam to food on each of the trays supported on the tray supports.

Figure 6:
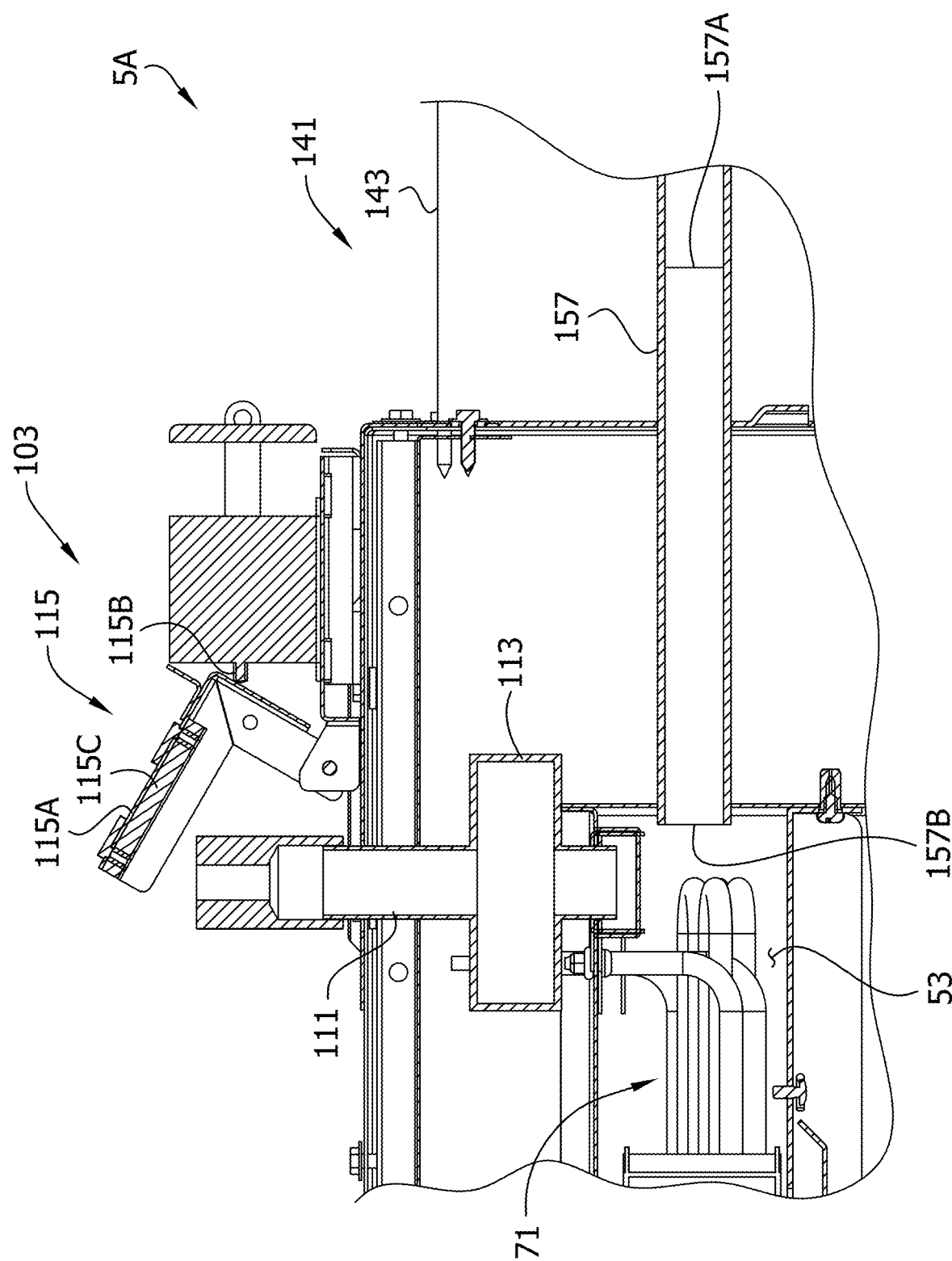
FIG. 6 is an enlarged view of a portion of the section of FIG. 4 showing a flue valve in an open position.
Figure 7:
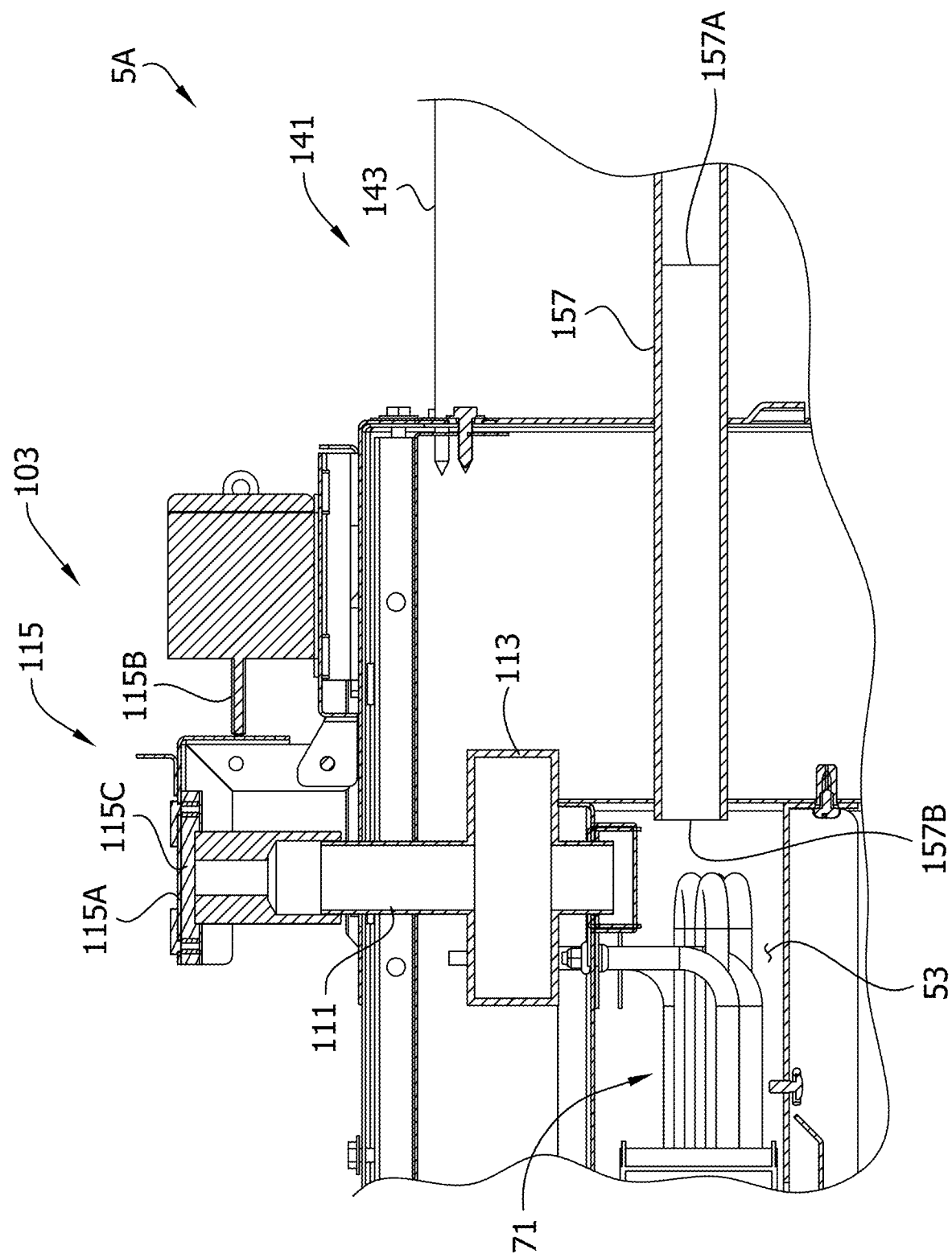
FIG. 7 is a view similar to FIG. 6 but showing the flue valve in a closed position.
Figure 8:
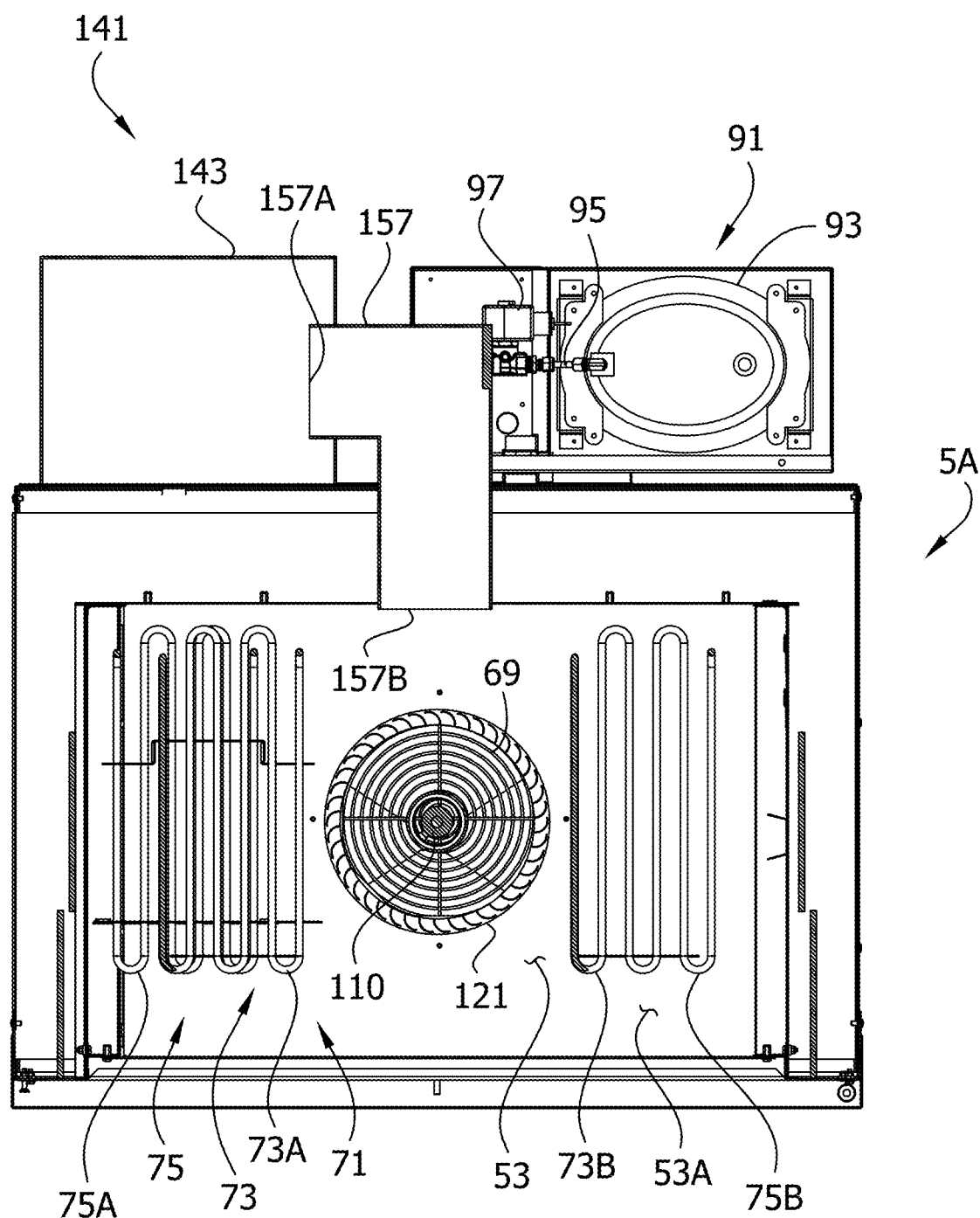
FIG. 8 is a section of the upper section taken lengthwise with respect to the upper section through an upper portion of a conduit system.

Referring to FIGS. 2, 4, and 5, a venting system 103 (broadly "food preparation environment control device") of the oven includes a vent conduit or flue 111 for permitting gas to escape from the chamber 11 to ambient. The chamber 11 and air conduit system 53 is generally a closed system in which substantially the same air re-circulates over and over. However, at various times, it may be desired to passively or actively vent the chamber 11. As shown in closer detail in FIGS. 6 and 7, the flue 111 extends from an inlet end communicating with the air conduit system 53 to an outlet end above the chamber. By way of example, the opening may be a 0.375-in. diameter opening. The venting system 103 includes a fan 113 is provided at an intermediate portion of the flue 111 between the inlet and outlet ends for actively exhausting gas from the chamber 11 via the flue. The venting system also includes a valve or cap 115 adjacent the outlet end of the flue 111 adapted for sealing the outlet of the flue to prevent venting. The valve 115 includes a valve member 115A selectively movable by a solenoid 115B for moving the valve member between an open position (e.g., FIG. 6) in which the valve member permits flow through the flue 111 and a closed position (e.g., FIG. 7) in which the valve member blocks fluid flow through the flue. In the illustrated embodiment, the valve member 115A includes a gasket 115C comprising resiliently compressible material which is compressed when pressed against the outlet end of the flue 111 for forming a suitable seal. For example, it may be desirable while injecting steam into the chamber 11 to close the flue 111 to prevent steam from escaping the chamber. Moreover, when a high-humidity operation such as proofing is finished, it may be desirable to actively vent the chamber 11 using the fan 113 to prepare for the baking cycle. With less relative humidity in the chamber 11, it requires less energy to heat the gas in the chamber to the higher baking temperature.

Referring to FIGS. 2 and 4, the chamber 11 includes a sloped floor 131 and drain 133 for collecting and draining condensed liquid from the bottom of the chamber 11. For example, some of the steam injected by the steam injection system 91 into the chamber 11 may condense inside the chamber. The sloped floor 131 of the chamber 11 promotes draining of the condensed liquid by gravity to the drain 133. In the illustrated embodiment, the floor includes front, rear, left and right sections 131A-131D sloping toward a central region of the floor to an inlet 133A of the drain 133. The drain 133 extends from the drain inlet 133A to a drain outlet 133B positioned for delivery of the drained condensate outside of the chamber 11 (e.g., to a catch basin). The drain 133 includes a valve 133C (FIG. 4) having an open position in which the valve permits flow of liquid through the drain and a closed position in which the valve blocks flow of liquid (and gas) through the drain. The valve 133C may be closed at various stages of recipes or for entire recipes, depending on whether it is desired to prevent liquid from draining from the chamber 11 and/or to prevent gas from entering the chamber through the drain. Generally speaking, the drain 133 may be closed by the valve 133C at the same times the flue 111 is closed by the valve 115. Sloped chamber floors having other configurations (e.g., primarily toward a rear of the chamber rather than the center of the chamber) and other types of drains may be used without departing from the scope of the present invention. For example, the drain inlet 133A may serve as a steam injection port into the chamber 11. The steam delivery conduit 95 may be in communication with the drain inlet 133A via a three-way valve having a first open position in which steam is permitted to flow into the chamber 11 from the steam delivery conduit 95, a second open position in which liquid from the chamber 11 is permitted to enter the drain 133A, and a third closed position in which the valve blocks flow of steam and condensate.

Figure 9:
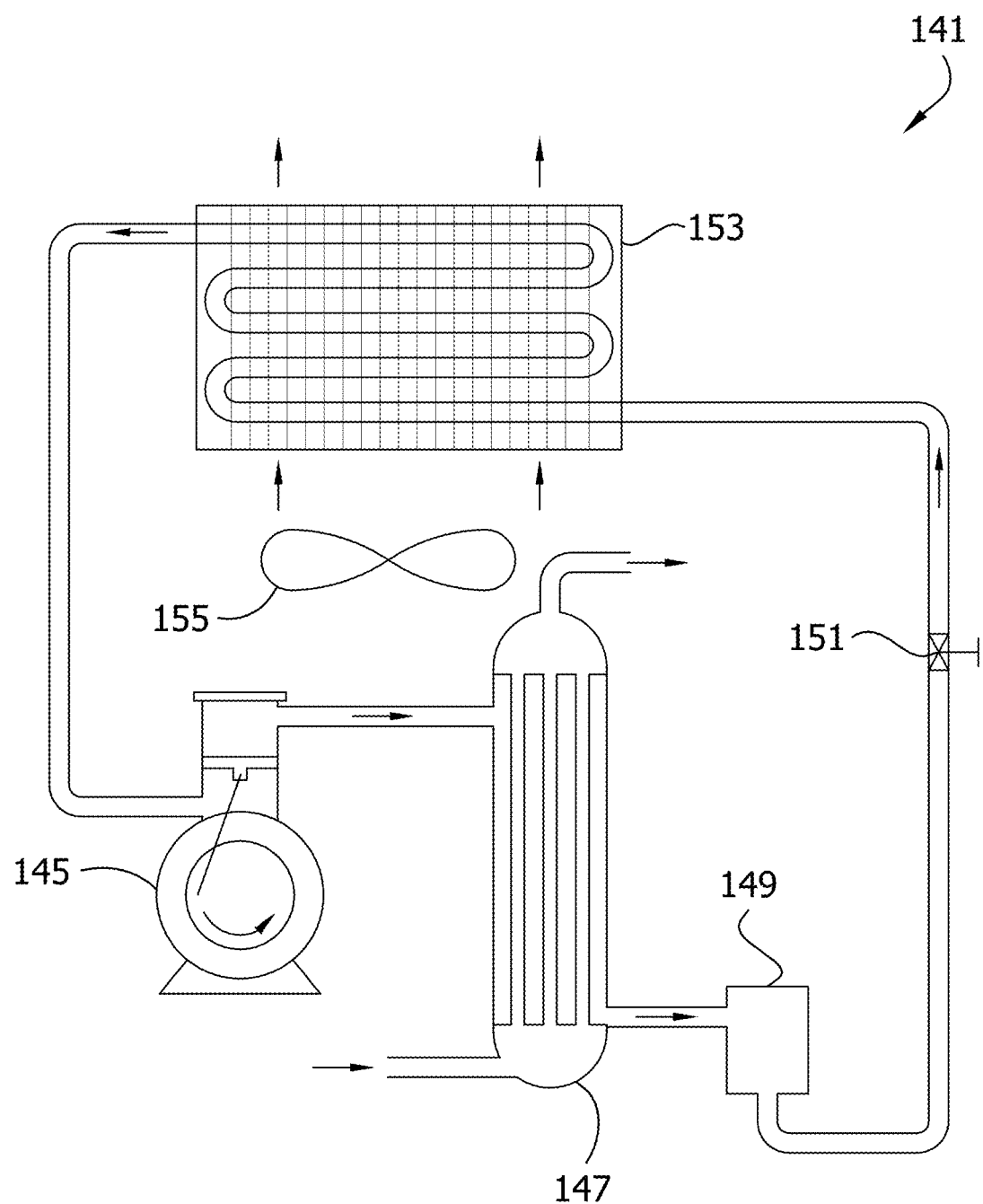
FIG. 9 is a schematic of a refrigeration system of the upper section.

As shown in FIGS. 4, 5, and 9, the oven 1 includes a refrigeration system 141 (broadly "food preparation environment control device") that may be used for a retarding operation in the same chamber 11 in which the dough is proofed and/or baked. In addition, the refrigeration system may be used during other recipes, such as for proofing or baking recipes, or between recipes to rapidly cool the chamber to prepare for a recipe calling for a lesser temperature than a previously executed recipe. The refrigeration system 141 is supported on the oven 1, and more particularly in a housing 143 on the rear side of the upper section 5A. Example refrigeration system components which may be supported in the housing 143 are shown schematically in FIG. 9. For example, the refrigeration system 141 may include a compressor 145, a condenser 147, a refrigerant receiver 149, an expansion valve 151, and an evaporator 153. Persons having ordinary skill in the art will understand air blown over the evaporator 153 (e.g., by a fan 155) will be cooled. The cooled air is delivered from the refrigeration system 141 via a cool air conduit 157 having an inlet end 157A connected to the refrigeration housing 143 and an outlet end 157B in communication with the rear, upper portion of the duct system 53 above the chamber 11. The cool air moves through the duct system 53 and enters the chamber 11 via the outlet openings 65 in the sides of the chamber. Accordingly, dough may be placed in the chamber 11 to be held in refrigerated conditions in a retarding operation (e.g., prior to proofing and baking the dough in the same chamber). Moreover, the dough may be held in a frozen or slacked state for a period of time prior to a retarding operation. In addition, the refrigeration system 141 may be used to rapidly cool the chamber 11 between baking and proofing operations, or to rapidly cool the chamber at or near an end of a bake operation to permit the bread to be served for consumption more quickly. Refrigeration systems having other configurations may be used without departing from the scope of the present invention. For example, the refrigeration system 141 may include a warm air return from the chamber 11 to the refrigeration housing 143. Moreover, refrigeration systems other than vapor-compression refrigeration systems may be used. For example, the refrigeration system may include a heat pump, Peltier device, solid state refrigerator, or thermoelectric cooler.

As is now apparent, the oven 1 includes suitable components and systems (e.g., food preparation environment control devices) such that the chamber 11 may be used for retarding, proofing, and baking, if desired. Ovens not having all of these capabilities (e.g., capable of only proofing and baking, or only baking) may be used without departing from the scope of the present invention. For example, the refrigeration system 141 may be omitted.

Figure 10:
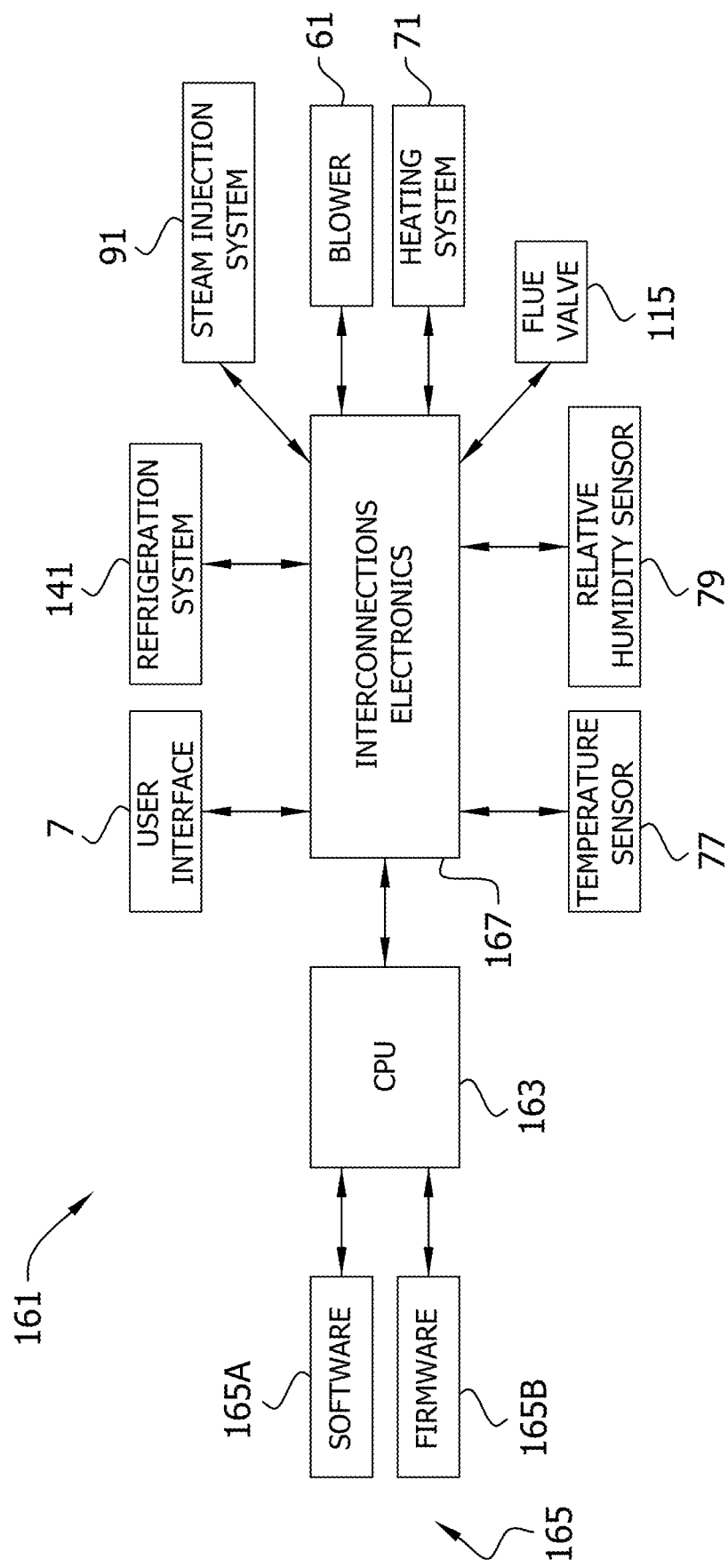
FIG. 10 is a schematic of a control system for the oven.

As shown schematically in FIG. 10, a control system 161 for the oven may include a central processing unit (CPU) 163, a tangible storage medium 165 (e.g., including forms of storage such as software 165A and firmware 165B), and the user interface 7. The CPU 163 may be a microprocessor or the like. The control system 161 includes interconnection electronics 167 that operatively connect the various components of the control system with other components of the oven, such as the refrigeration system 141, steam injection system 91, flue valve 115, blower 61, heating system 71, and temperature and relative humidity sensors 77, 79. The CPU 163 is adapted for reading and executing instructions stored in the storage medium 165, and is responsive to the user interface 7, for controlling the various components and systems of the oven 1. A user can enter or modify instructions stored on the storage medium 165 via the user interface 7. In the illustrated embodiment, the user interface 7 is a touch screen, as explained in further detail below. Other types of user interfaces may be used without departing from the present invention. The user interface 7 provides command signals via the interconnection electronics 167 to the CPU 163. The command signals can include changes to the parameters (e.g., time, temperature, humidity, etc.) stored in the tangible storage medium 165. The CPU 163 responds to the command signals and provides control signals corresponding thereto via the interconnection electronics 167 to the various components and systems of the oven 1. For example, the interconnection electronics 167 may include electrical or fiber optic lines or wireless communication devices.

As will be described with reference to FIGS. 11-15, 29, and 30, the user interface 7 is adapted for permitting a user to program various retarding, proofing, and baking recipes (broadly "food preparation recipes"). The user interface 7 provides the user the ability to program individual parameters or aspects of retarding, proofing, and baking recipes independently of each other for controlling the food preparation environment control devices. The parameters can define operational states (e.g., active or inactive) of the food preparation environment control devices, such as the blower 61, heating system 71, humidification system 91, venting system 103, and/or refrigeration system 141. For example, start times and durations of various stages of a baking recipe can be customized and defined with respect to a recipe time (e.g., countdown time). The user interface 7 illustrates to the user in graphical format operational states of the food preparation environment control devices according to the programmed parameters of a recipe for enhanced user understanding of the programmed parameters and recipe. This may be particularly useful when a recipe such as a baking recipe includes various functions such as humidification (e.g., steam injection) and venting which may include stages and/or operational states having overlapping durations. For example, operational states for the food preparation environment control devices may include the state of being "active" (e.g., "on") or "inactive" (e.g., "off"). It will be appreciated the user interface 7 may be used with other food preparation apparatus (e.g., for food cooking, baking, frying, mixing, washing, sanitizing, etc.) and/or for programming other types of food preparation recipes without departing from the scope of the present invention.

Figure 11:
FIG. 11 is a photograph of a screenshot of a user interface of the oven showing a recipe menu home screen.

Referring to FIG. 11, in the illustrated embodiment, the user interface 7 is a touch screen, including both a user input and a display. The display includes a color liquid crystal display screen, and the user input includes a touch-sensitive panel overlaying the display screen. The display includes a graphical display 201 (e.g., see FIG. 15) for displaying graphical representations associated with a programmed recipe, as will be explained in further detail below. The user input includes "actuators" at various areas of the touch screen where the touch screen is responsive to the touch of a user. The actuators may be identifiable to the user by text or graphic information on the display underlying respective areas of the touch sensitive panel. Accordingly, to an extent, the user input includes the display or portions of the display (e.g., for making the actuators and their functions identifiable to the user). Other types of user interfaces may be used without departing from the present invention. For example, the display and user input may be separate from one another. The display may include other types of screens or indicators. Moreover, the user input may comprise other types of actuators, such as keyboards, mice, buttons, switches, or even microphones for receiving information from the user.

As shown in FIG. 11, a Recipe Menu Home Screen is displayed on the touch screen 7. The screen is divided into upper and lower sections corresponding to the upper and lower sections of the oven 1. The lower section is shown as being configured as a proofer and having corresponding controls. Operation of the upper section will be described in further detail hereafter, with the understanding that the lower section could be configured to execute the same or different operations as the upper section, as explained above. The upper section of the screen includes an icon representative of the upper section of the oven to indicate to the user that the controls relate to the upper oven section. On this screen, the user has the option of selecting from a plurality of recipes stored on the tangible storage medium. As illustrated, three recipes are displayed, including Retard, Proof, and Bread (Bake). The user could begin execution of one of these recipes by pressing the respective actuator. Other recipes could be accessed by using Page Left or Page Right actuators.

Figure 12:
FIG. 12 is a photograph of a screenshot of the user interface showing a recipe edit home screen.

If it is desired to program a new recipe or modify an existing recipe, the user may press the actuator at the top right of the screen represented by an exclamation point. This brings the user to a Recipe Edit Home Screen, as shown in FIG. 12. The Recipe Edit Home Screen provides a list of all recipes stored in the tangible storage medium 165. The list of recipes includes the Retard, Proof, and Bread (Bake) recipes displayed previously on the Recipe Menu Home Screen (FIG. 11). The user may select any of the recipes by pressing the respective actuator.

Figure 13:
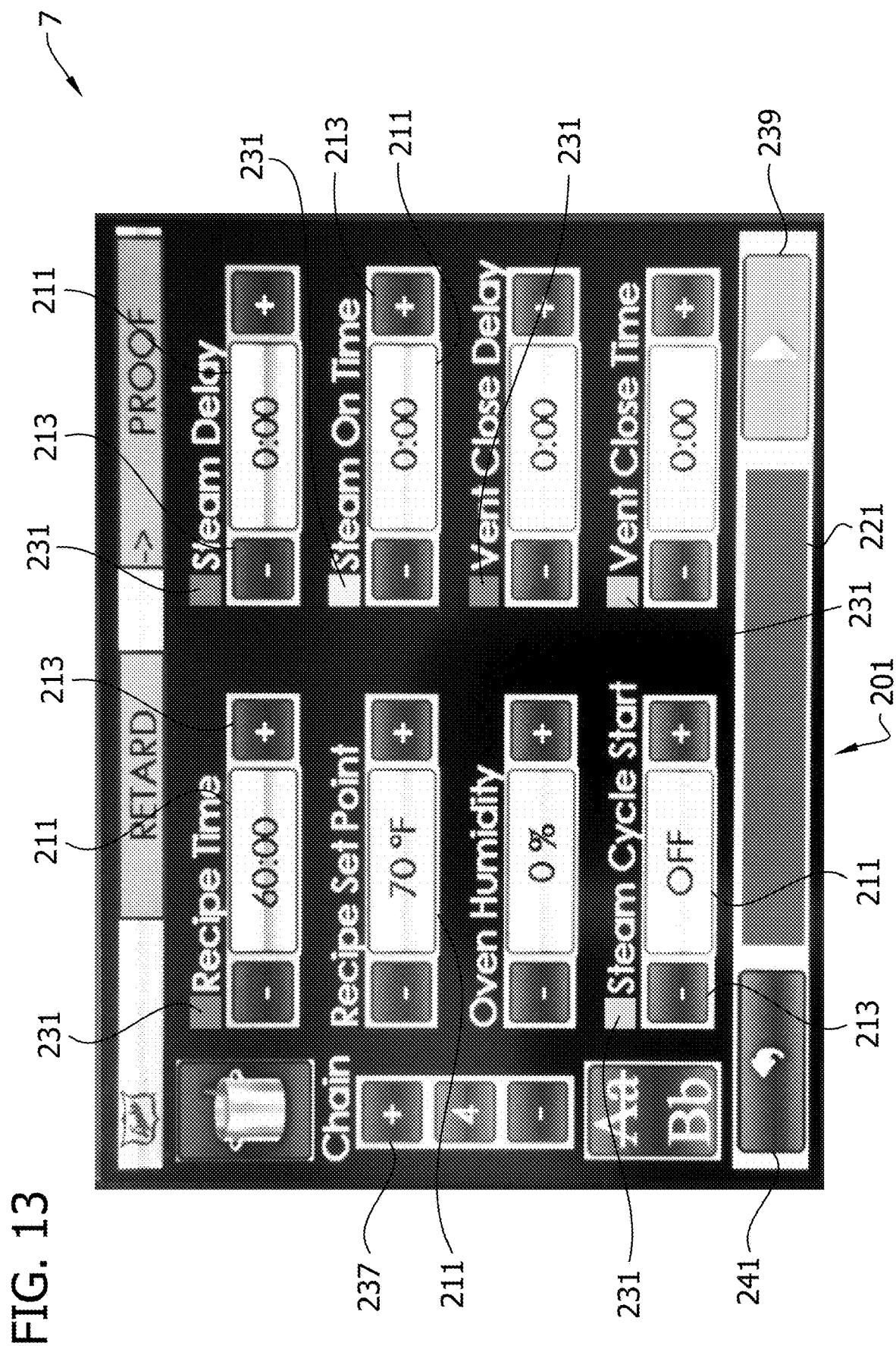
FIG. 13 is a photograph of a screenshot of the user interface showing a retard recipe program screen.

For example, pressing the Retard actuator causes the display to show the Retard Recipe Program Screen of FIG. 13. The recipe being programmed is indicated by the word "RETARD" displayed at the top of the screen. The screen lists several parameters on the user input which may be programmed in a given recipe. For example, the parameters include Recipe Time, Recipe Set Point (temperature), Oven Humidity, Steam Cycle Start, Steam Delay, Steam On Time, Vent Close Delay, and Vent Close Time. Each of the parameters includes a parameter value display 211 (i.e., indicating the programmed value for the respective parameter) and an actuator 213 permitting the user to change the displayed value. In the illustrated case, the actuators 213 each include plus and minus buttons for increasing or decreasing the programmed value. In the Retard recipe as displayed, the Recipe Time is 60:00 minutes and the Recipe Set Point (temperature) is 38 degrees F. All of the other programmable parameters are not used or set to zero. The graphical display 201 on the screen includes a graphical representation 221 of the programmed recipe in the form of a two-dimensional bar graph adjacent the bottom of the screen. Colors used in the bar graph correspond to colors of parameter color indicators 231 (e.g., colored boxes) adjacent each programmable parameter label. The bar graph 221 represents the operational states of food preparation environment control devices used in the recipe according to the parameters displayed by the screen as a function of time (horizontal axis). The recipe has a beginning at the left side of the bar graph, an end at the right side of the bar graph, and a duration (recipe time) extending between the two ends. In this case, the graph is a solid red bar extending from the left to the right. The red color of the graph corresponds to the red color of the color indicator 231 next to the Recipe Time parameter label. The user can select whether to "chain" a second recipe to the recipe being programmed such that the control system operates the chained recipe automatically after execution of the displayed recipe. In the illustrated case, the Proof recipe is chained to the Retard recipe, as indicated by the arrow and word "PROOF" displayed at the top right of the screen. The chained recipe can be changed by adjusting the Chain parameter using a chain actuator 237 (i.e., plus or minus actuators) on the left side of the screen. The Proof recipe is the fourth recipe listed on the Recipe Edit Screen (FIG. 12). Accordingly, a number 4 is displayed in the value display of the Chain parameter. When the recipe is programmed as desired, the recipe is saved to the tangible memory 165 by pressing the save actuator 239 represented by the arrow at the bottom right of the screen. Pressing the back arrow actuator 241 at the bottom left of the screen brings the user back to the Recipe Edit Home Screen, where the user can then select a different recipe to be programmed.

Figure 14:
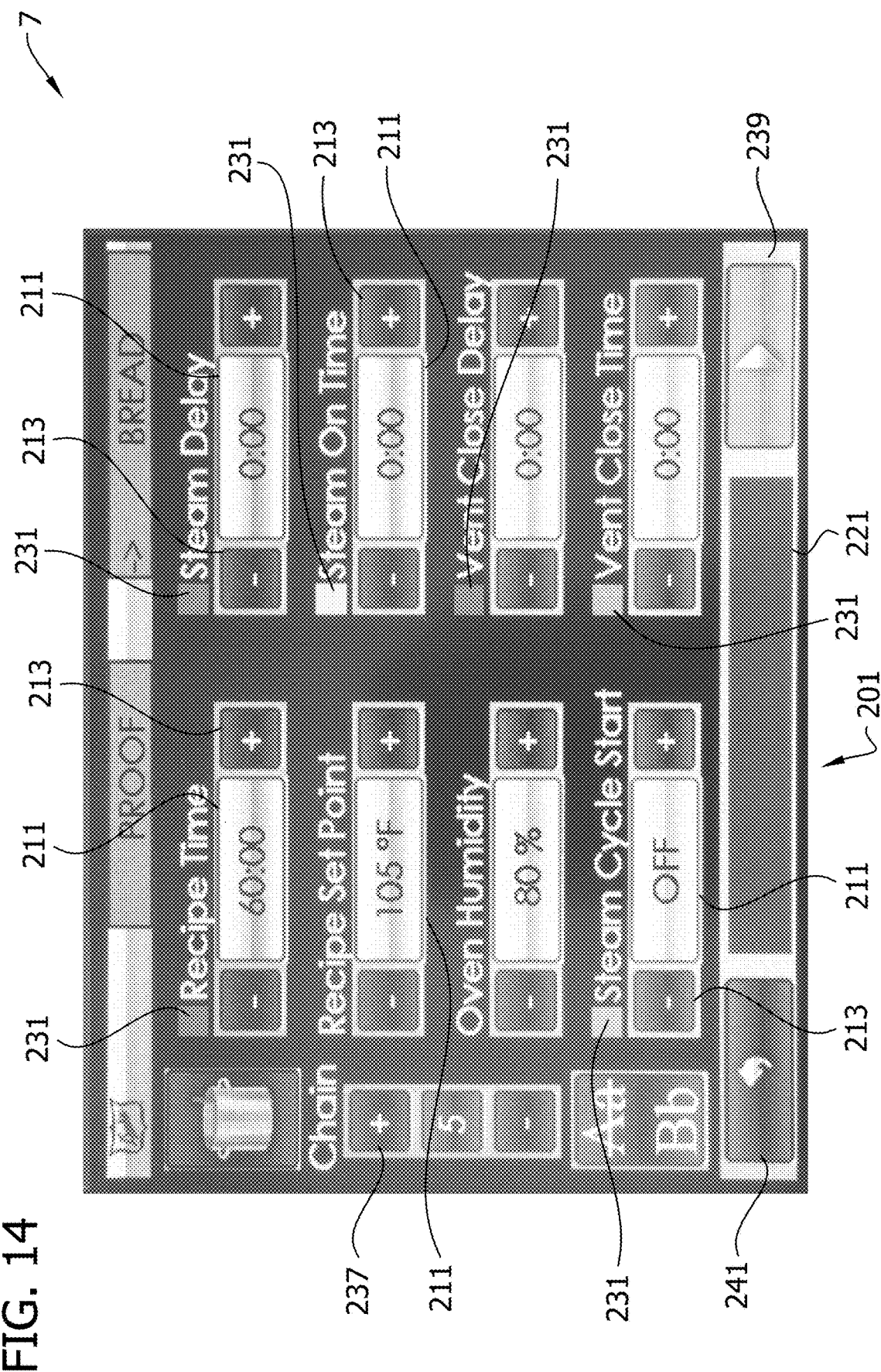
FIG. 14 is a photograph of a screenshot of the user interface showing a proof recipe program screen.

FIG. 14 shows a Proof Recipe Program Screen including similar parameters as listed on the Retard Recipe Program Screen. In this case, the Proof recipe parameters include a Recipe Time of 60:00 minutes, a Recipe Set Point (temperature) of 105 degrees F., and an Oven Humidity of 80%. All of the other parameters are turned off or set to zero. The graphical representation 251 (bar graph) of the recipe on the graphical display 201 at the bottom of the screen is similar to the bar graph 231 (FIG. 13) representing the Retard recipe. The chained recipe in this case is the Bread (Bake) recipe. After the Proof recipe is programmed as desired, it is saved to the tangible storage medium 165.

Figure 15:
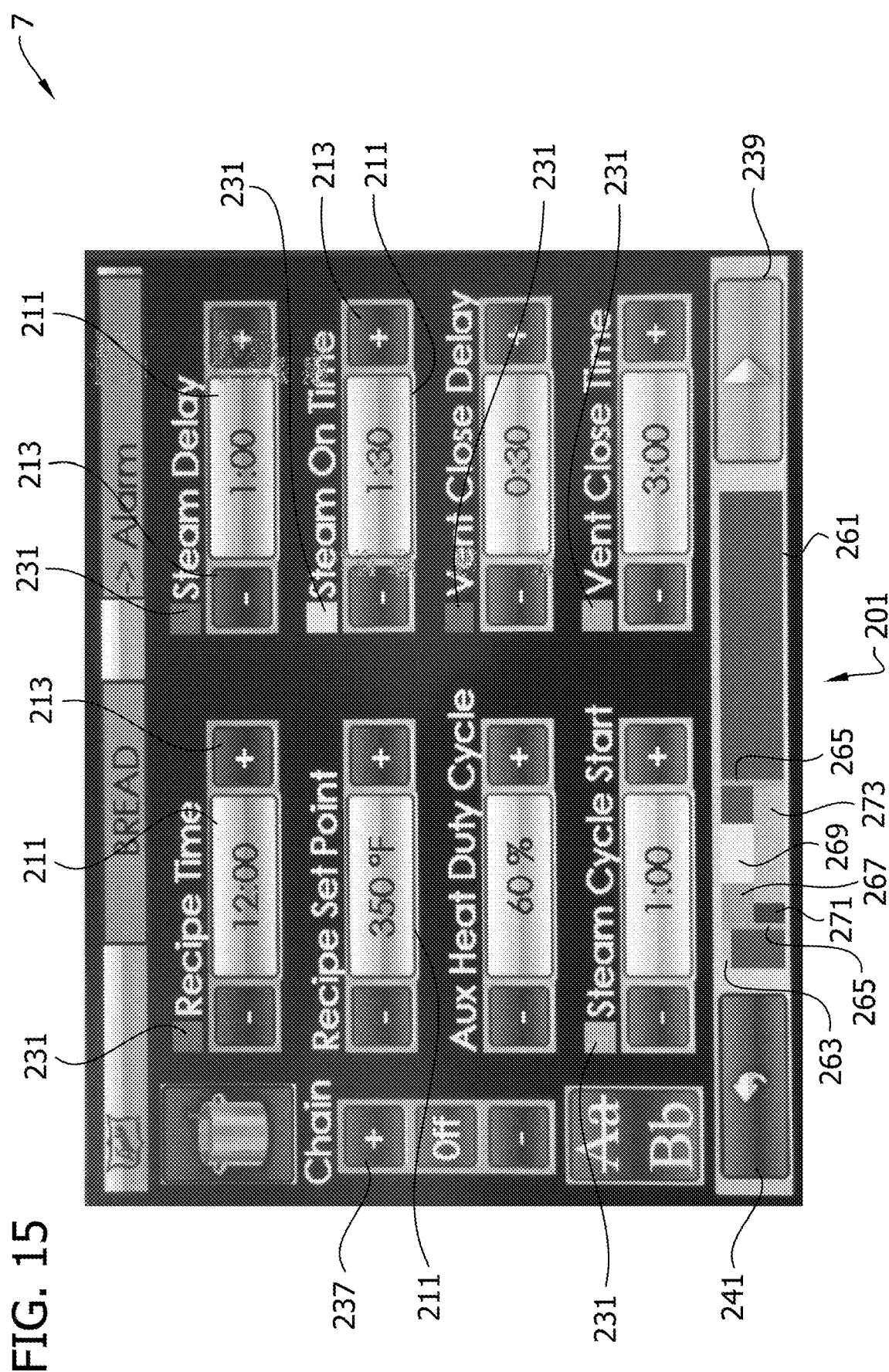
FIG. 15 is a photograph of a screenshot of the user interface showing a bread recipe program screen.

FIG. 15 shows a Bread Recipe Program Screen including similar parameters as listed on the prior recipe program screens. The chained recipe is programmed for "off," such that no recipe will be automatically executed following the Bread recipe, and an alarm will sound at the end of the recipe, as indicated by the word "ALARM" at the top right of the screen. For the Bread recipe, the parameter Aux Heat Duty Cycle is provided in place of Oven Humidity. Moreover, all of the available parameters are used as part of the recipe, including steam cycle parameters Steam Delay, Steam On Time, Vent Close Delay, and Vent Close Time. It will be appreciated that the Steam Delay parameter defines an inactive operational status of the humidification system 91, the Steam On Time defines an active operational status of the humidification system, the Vent Close Delay defines an active operational status of the venting system 103 (i.e., flue open), and the Vent Close Time defines an inactive operation status of the venting system (i.e., flue valve closed). As explained above, a steam cycle may be advantageous in a bake recipe to improve the color, taste, and/or texture of the bread crust. The programmed parameters for the displayed recipe include Recipe Time at 12:00 minutes, Recipe Set Point (temperature) at 350 degrees F., Aux Heat Duty Cycle at 60%, Steam Cycle Start at 1:00 minute, Steam Delay at 1:00 minute, Steam On Time at 1:30 minutes, Vent Close Delay at 0:30 minute, and Vent Close Time at 3:00 minutes.

Still referring to FIG. 15, the graphical representation 261 of operational status of the food preparation environment control devices used in the recipe is displayed in the graphic display 201 at the bottom of the screen and includes several colors for this recipe. The horizontal scale of the bar graph 261 is set by the recipe time of 12:00 minutes. The operational status of the food preparation environment control devices associated with the programmed parameters are displayed with respect to one another as a function of time along the bar graph 261 in proportion to the scale of the recipe time. For example, at the left side of the bar graph, a blue bar 263 corresponds to the light blue color indicator 231 of Steam Cycle Start and has a length extending from the left to the right corresponding to the programmed 1:00 minute and shown in proportion to the 12:00 minute length of the red bar (i.e., the full width of the bar graph 261) indicating the Recipe Time. The Steam Cycle Start bar 263 has a beginning, an end, and a duration, as with the other bars displayed on the bar graph. The Steam Cycle Start bar 263 represents a delay in the start of the steam cycle. During the Steam Cycle Start, the chamber 11 may be heated at the Recipe Set Point as a "pre-bake" before the beginning of the steam cycle. The blower 61 and heating system 71 may operate to maintain the set point temperature in the chamber 11. At the end of the Steam Cycle Start, the steam cycle begins. The blower 61 and heating system 71 may be de-energized or turned off during the steam cycle and re-energized after the steam cycle is finished. Alternatively, the blower 61 may operate at a low speed or may be pulsed to provide gentle gas flow during the steam cycle. As shown in the graph, the steam cycle includes a beginning and an end indicated by vertically extending orange bars 265. The duration of the steam cycle extends between the vertical bars and includes colored bars representative of different stages of the steam cycle. The steam cycle includes a first or steaming function and a second or venting function. The two functions are displayed separately on the bar graph in two rows, one above the other. The steaming function is indicated by the top row on the graph 261 and includes the stages Steam Delay and Steam On Time. The Steam Delay is indicated by a dark green bar 267 corresponding to the dark green color indicator 231 next to the Steam Delay parameter label. The Steam On Time is indicated by a yellow bar 269 corresponding to the yellow color indicator 231 next to the Steam On Time parameter label. The venting function is indicated by the bottom row on the graph and includes stages Vent Close Delay and Vent Close Time. The Vent Close Delay and Vent Close Time are indicated by a blue bar 271 and a light green bar 273, respectively, corresponding to the blue and light green color indicators 231 next to the Vent Close Delay and Vent Close Time parameter labels. Accordingly, the stages of the two functions of the steam cycle are displayed with respect to each other as a function of time. The graphical representation of the programmed steam cycle permits a user to quickly and conveniently understand how the beginning, end, and duration of each of the functions and their stages relate to each other. For example, it is readily apparent by comparison of the beginning of the light green bar 273 at the bottom of the graph 261 to the beginning of the yellow bar 269 at the top of the graph that the steam injection (Steam On Time) is programmed to begin after the flue valve 115 is closed (Vent Close Time). The graph 261 permits the user to rapidly understand how adjustment of one or more parameters affects the recipe as a whole. The programmed parameters are saved to the tangible storage medium 165.

As noted herein, the screen of the user interface 7 includes a graphical representation 221, 251, 261 of the operational statuses associated with the recipe according to the parameters displayed by the screen. When a user touches the screen and changes one of the parameters, the touch screen 7 provides command signals indicative of the changed parameter to the CPU 163, which responds by providing corresponding control signals to the affected components and systems of the oven 1. The CPU 163 stores the parameter changes in the tangible storage medium 165. In addition, the CPU 163 responds to the parameter changes stored in the medium 165 by revising the graphical representation of the programmed recipe illustrated on the screen to reflect the changed parameters. Thus, the screen illustrates in real time as a bar graph the recipe according to the parameters displayed by the screen. Other graphical representations of the recipe may be displayed by the screen without departing from the scope of the present invention.

It will be appreciated that the programmable parameters shown in the recipe program screens of FIGS. 13, 14, and 15, are provided by example without limitation. For example, the user interface 7 may be configured, for retard, proof, bake, or other recipes, to permit the user to program other functions such as various temperature set points at different times of a recipe, start times and run durations for the blower 61 and/or flue vent fan 113, open times and durations for the flue valve 115 and drain valve, start and run durations for the refrigeration system 141, and/or other parameters. This would provide the user with increased adjustability for tailoring recipes to achieve desired characteristics. Moreover, it will be understood that these parameters may be displayed in a graphical representation like discussed above. For example, if the user interface 7 permitted the user to define the start time and run duration of the blower 61 that parameter could be reflected on the bar graph in the form of a third function including a suitable bar or bars (e.g., positioned above or below the illustrated function bars).

Figure 16:
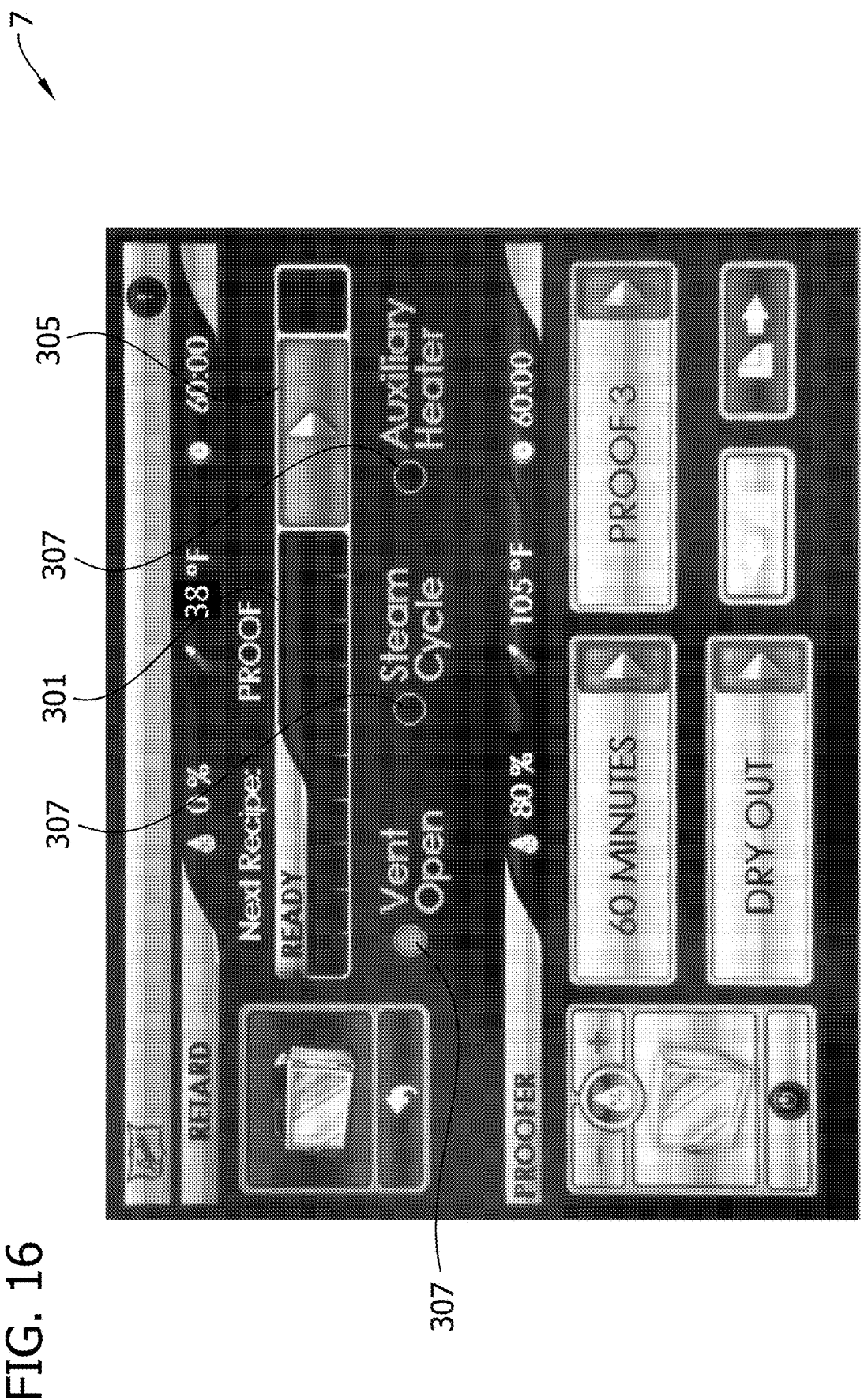
FIG. 16 is a photograph of a screenshot of the user interface showing a retard recipe ready screen.

An example operation of the oven will now be described with respect to the user interface views of FIGS. 11 and 16-28. Referring again to FIG. 11, a programmed recipe may be selected for execution from the Recipe Menu Home Screen. Assuming the user pressed the Retard actuator, the Retard Recipe Ready Screen of FIG. 16 would be shown. This screen includes recipe set point indicators along the top of the screen indicating the 0% Oven Humidity, 38 degrees F. Recipe Set Point, and 60:00 minute Recipe Time previously programmed. Below the recipe set point indicators, the screen indicates the "chained" recipe by the text "Next Recipe: PROOF," which was previously programmed. The screen also includes a time bar 301, a start actuator 305 represented by an arrow outlined in green, and a series of operational status indicators 307 relating to the programmed parameters, including Vent Open, Steam Cycle, and Auxiliary Heater. The operational status indicators 307 are shown as active (illuminated) or inactive (dark), and may show different active colors, depending on the status of the respective parameter or food preparation environment control device at any given time during execution of the recipe. The colors shown on the operational status indicators 307 when illuminated may correspond to the colors of the parameter color indicators next to the parameter labels on the recipe program screen.

Figure 17:
FIG. 17 is a photograph of a screenshot of the user interface showing a retard recipe run screen.
Figure 18:
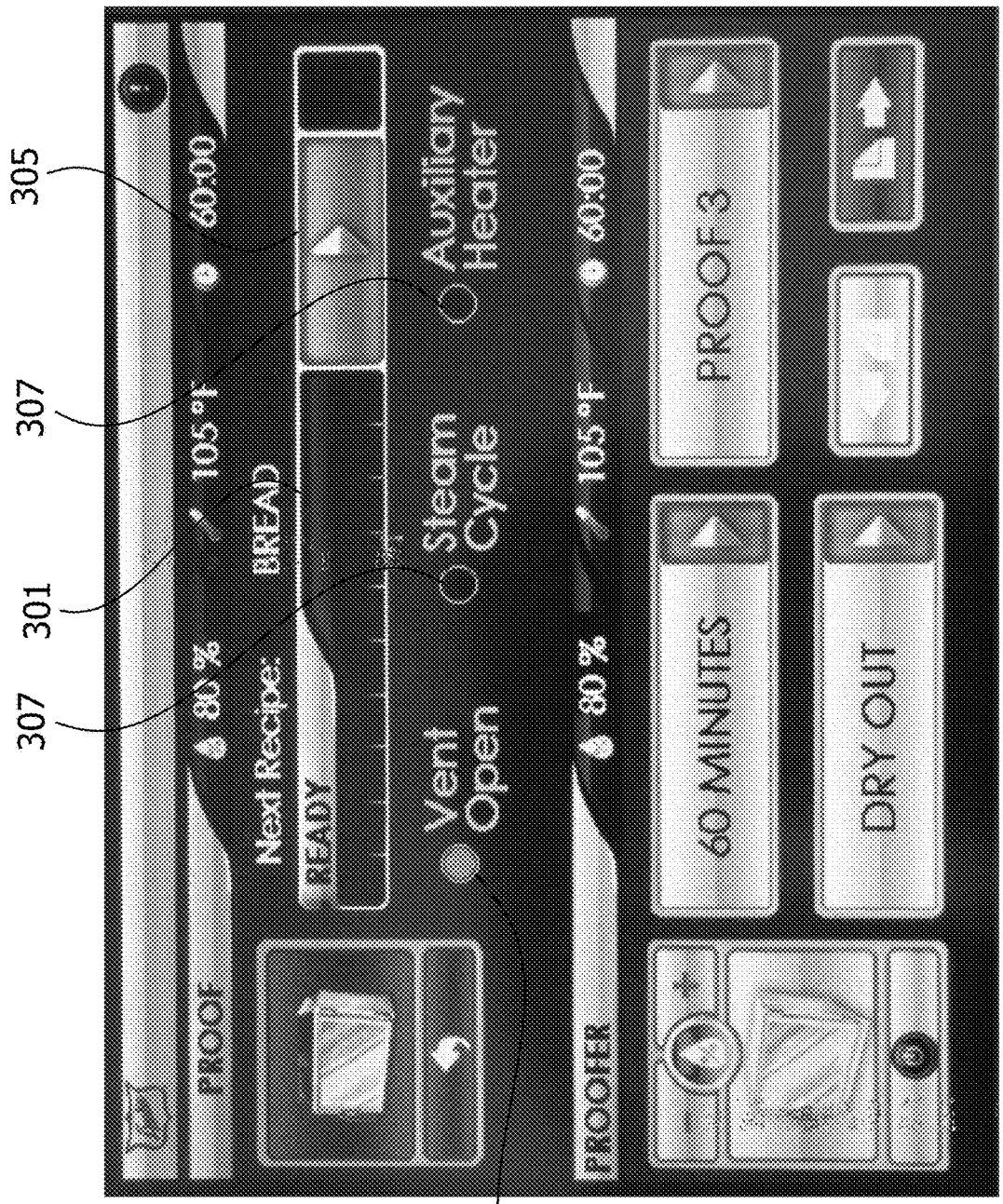
FIG. 18 is a photograph of a screenshot of the user interface showing a proof recipe ready screen.

After the user presses the start actuator 305, the oven will begin executing the recipe and the screen will change to the Retard Recipe Run Screen shown in FIG. 17. As the Retard recipe runs, the screen will look substantially the same as that displayed in FIG. 17 for the duration of the recipe, except the time bar 301 and a countdown timer 311 (collectively or separately, broadly referred to as "countdown display") will be continuously updated to indicate the passage of recipe time. The Vent Open operational status indicator 307 will be dark to indicate the flue valve 115 is closed. The refrigeration system 141 will be operated to maintain the 38 degrees F. set point for 60 minutes. The blower 61 may be off or operated in a relatively slow or pulsed fashion.

Figure 19:
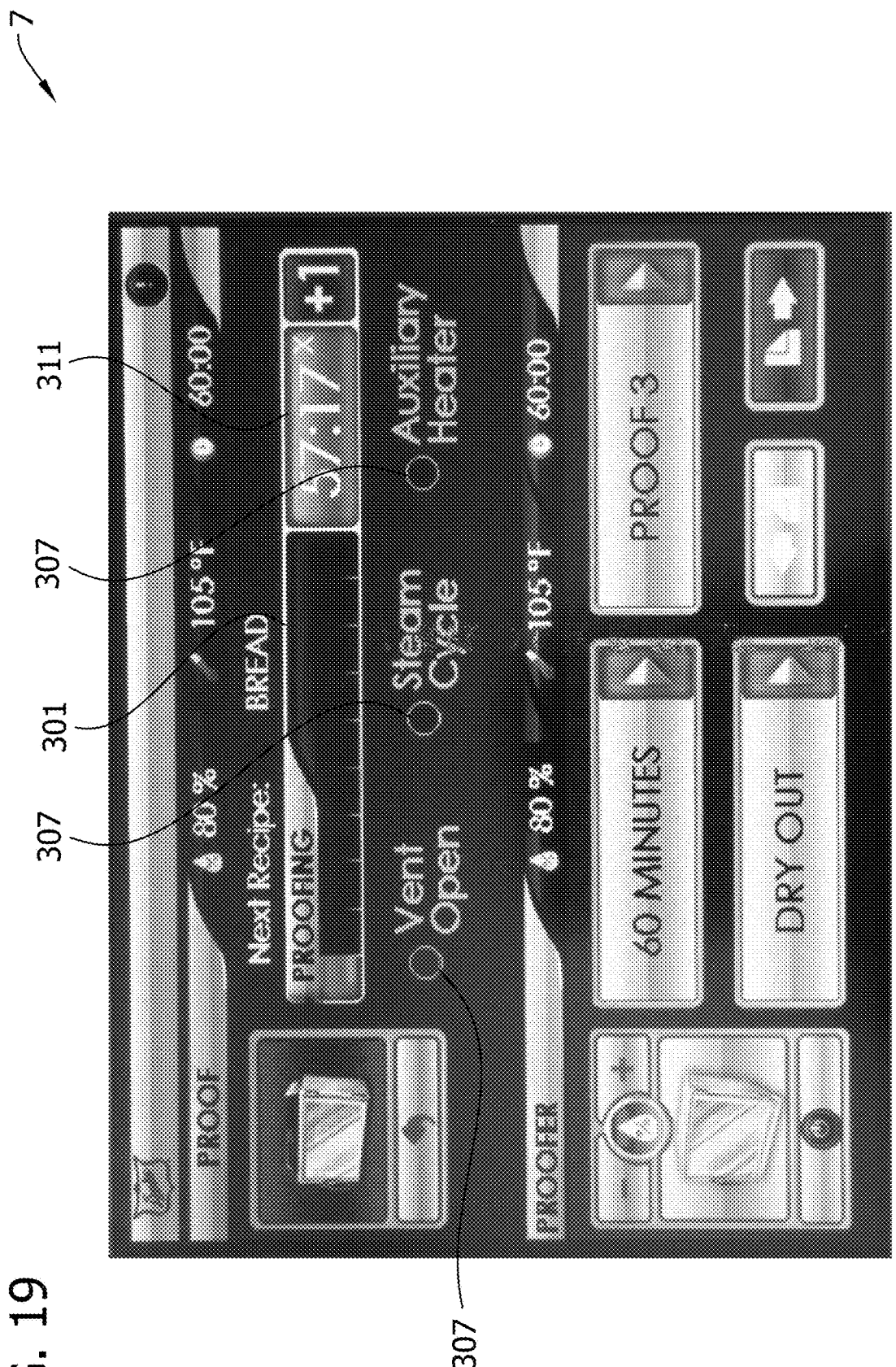
FIG. 19 is a photograph of a screenshot of the user interface showing a proof recipe run screen.
Figure 20:
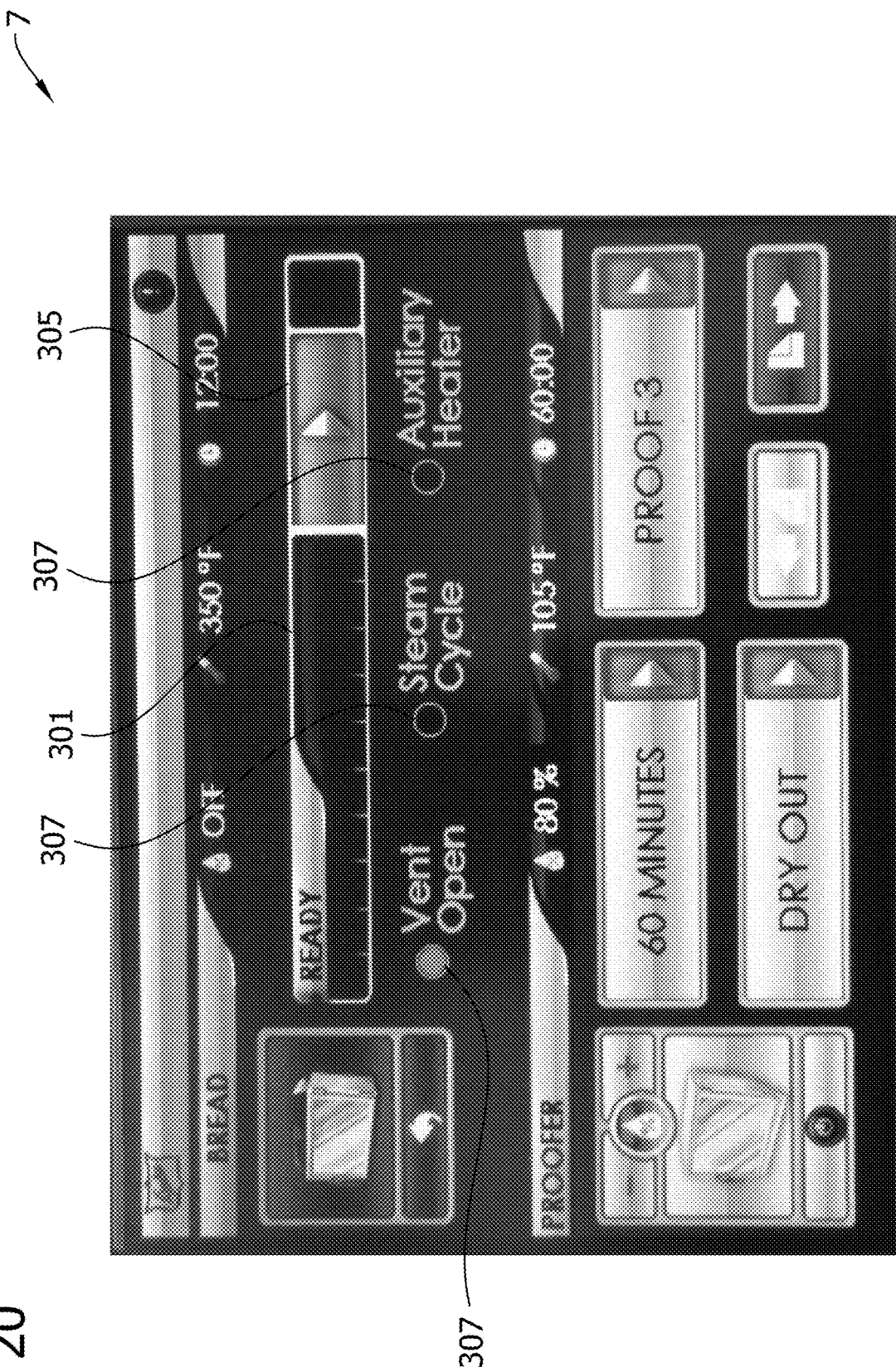
FIG. 20 is a photograph of a screenshot of the user interface showing a bread recipe ready screen.

At the end of the Retard recipe, the chained Proof recipe will begin automatically, and the Proof Recipe Run Screen of FIG. 19 will be shown. If the Proof recipe were not chained to start automatically, the user could navigate to the Proof Recipe Ready Screen shown in FIG. 18 and press the start actuator 305 to initiate the Proof recipe. As the Proof recipe runs, the screen will look substantially the same as that displayed in FIG. 19 for the duration of the recipe, except the time bar 301 and countdown timer 311 will be continuously updated to indicate the passage of recipe time. The Vent Open operational status indicator 307 is dark to indicate the flue valve is closed. The blower 61 and heating system 71 will operate to maintain the 105 degree F. set point, and the steam injection system 91 will operate as needed to maintain the 80% relative humidity set point for 60 minutes. Alternatively, a humidification system separate from the steam injection system 91 may be used in maintaining the 80% relative humidity set point. The blower 61 may be off or operated in a relatively slow or pulsed fashion.

Figure 21:
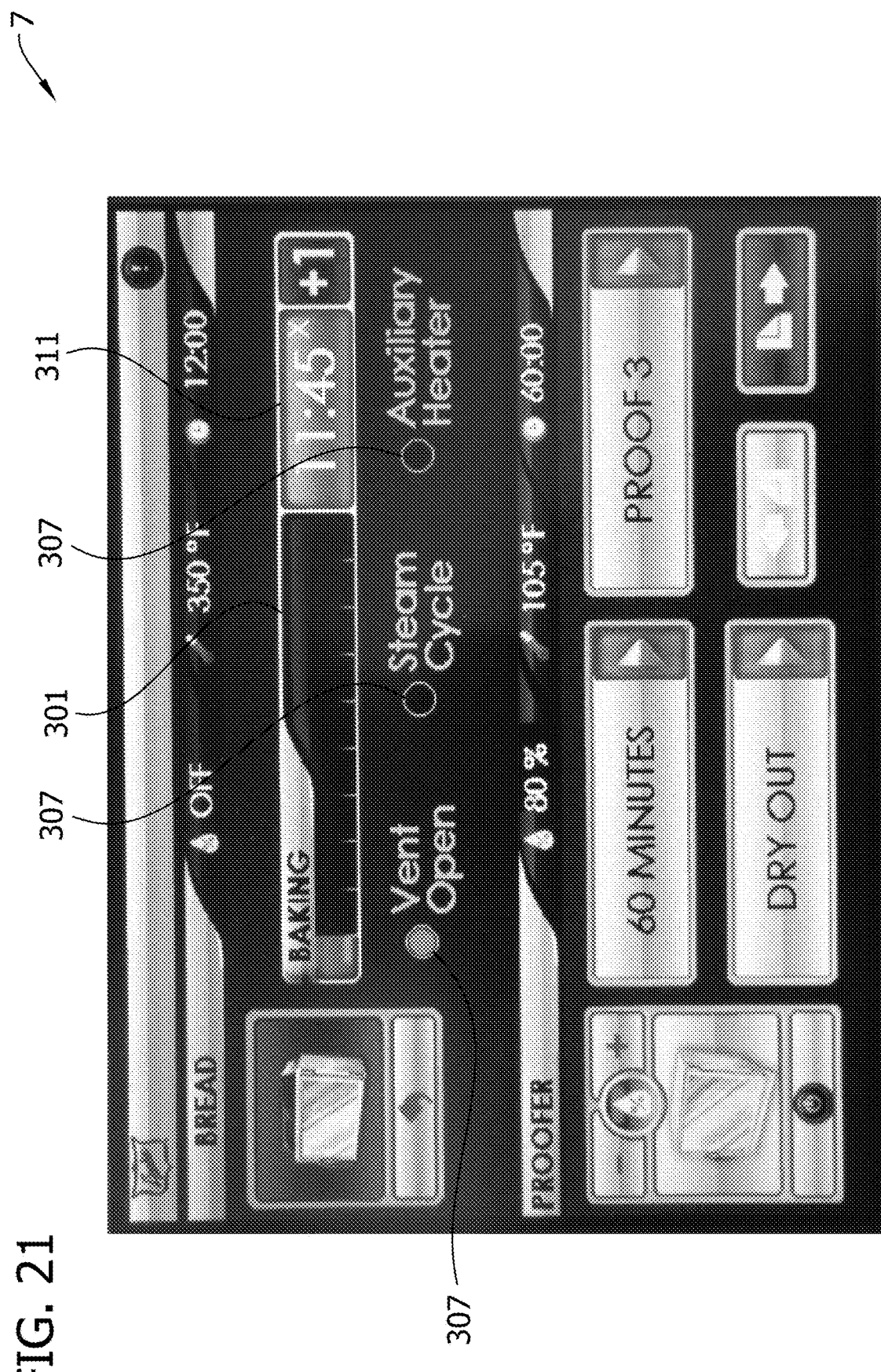
FIGS. 21-28 are photographs of screenshots of the user interface showing a bread recipe run screen at various stages of executing the bread recipe, with Vent Open, Steam Cycle, and Auxiliary Heat operational status indicators being shown in various states.
Figure 22:
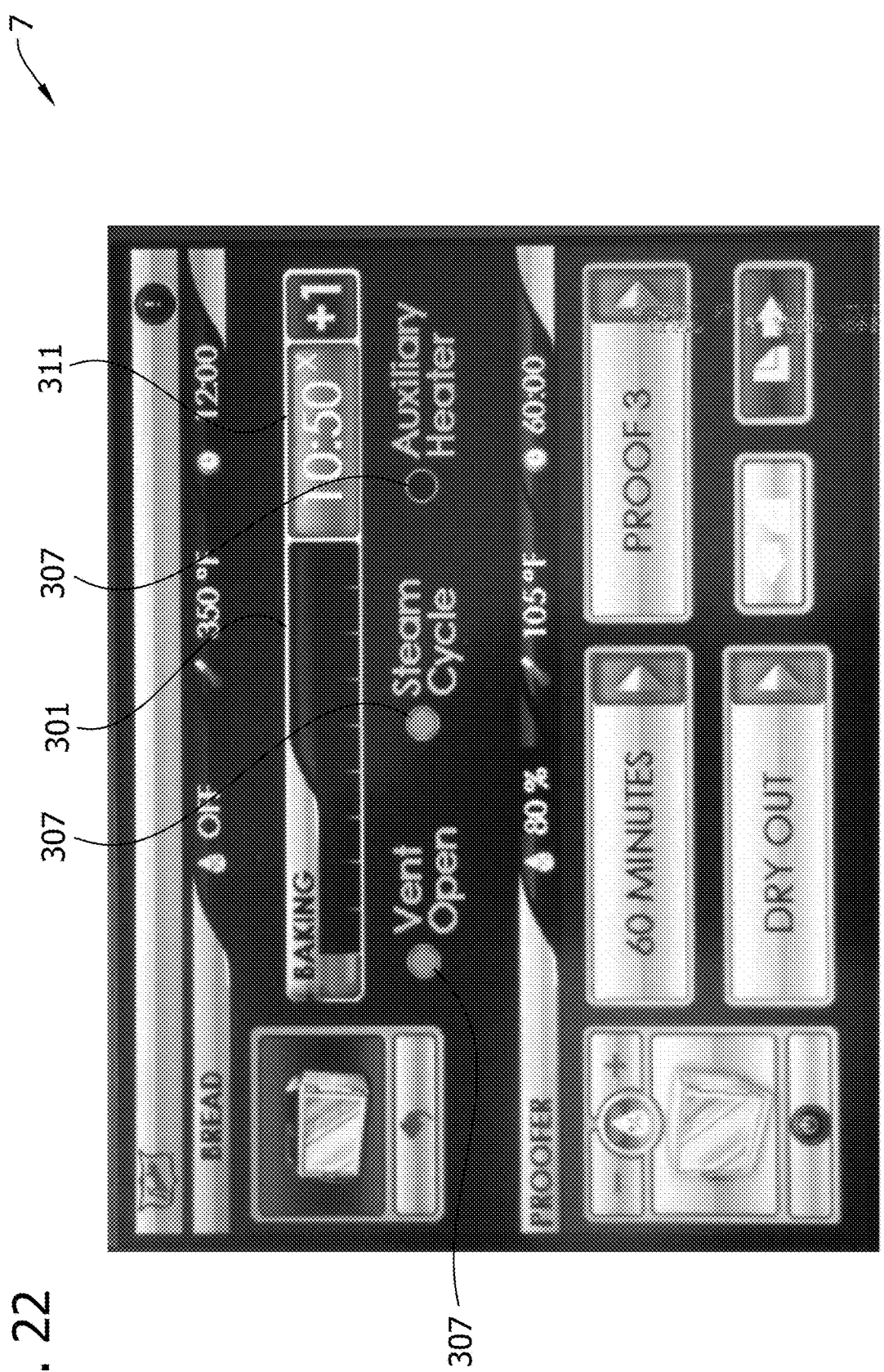
Figure 23:
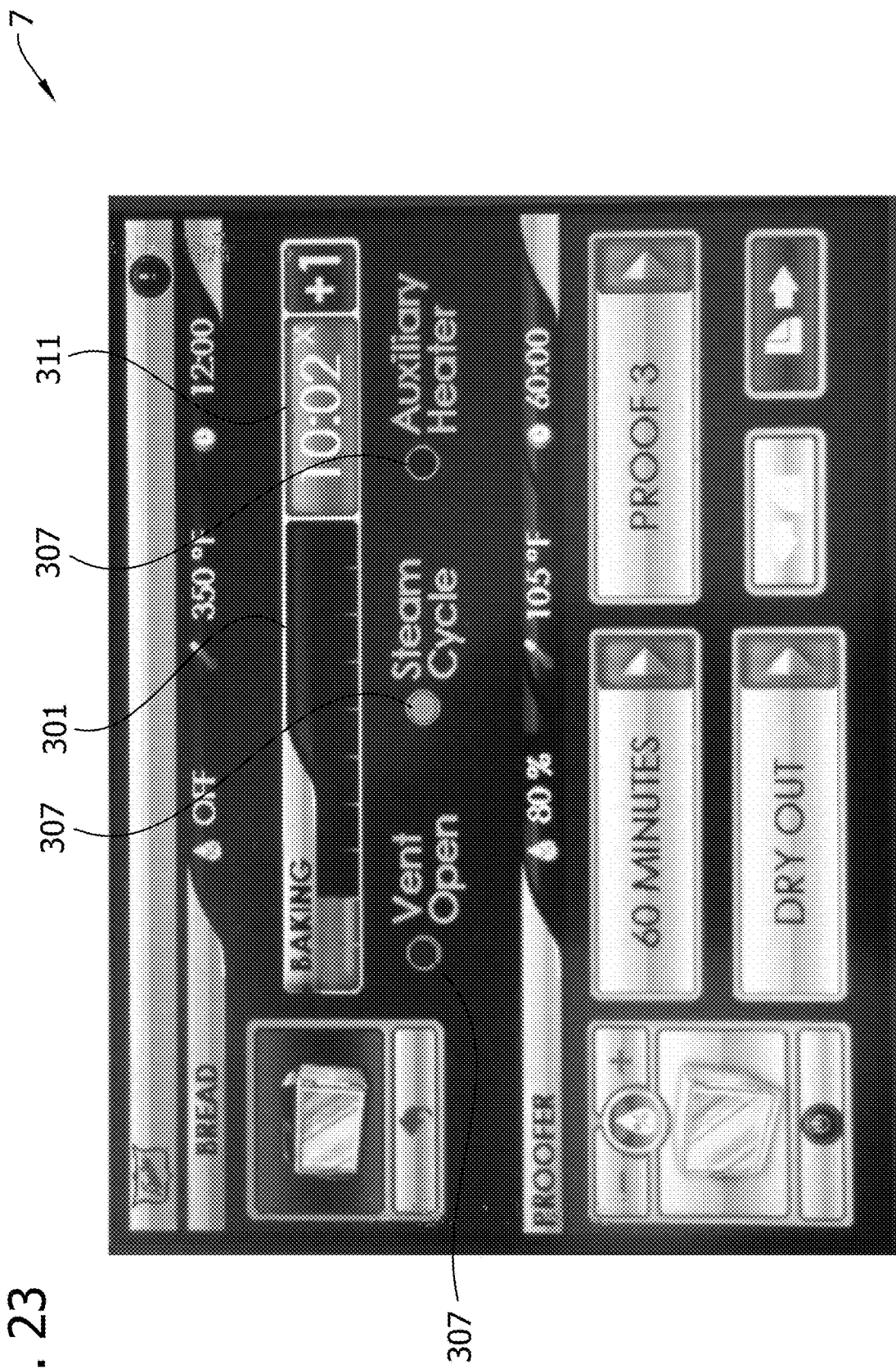
Figure 24:
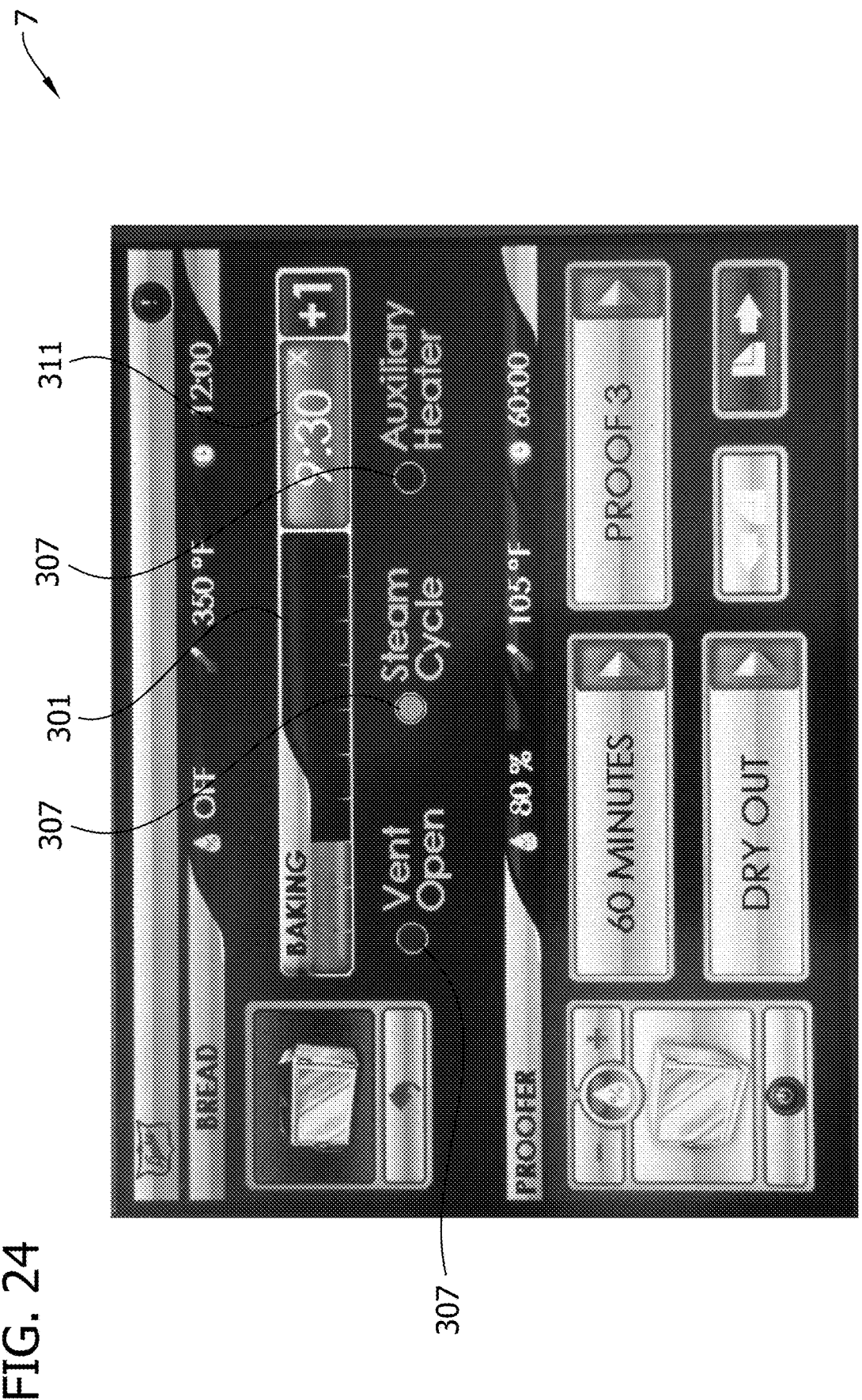
Figure 25:
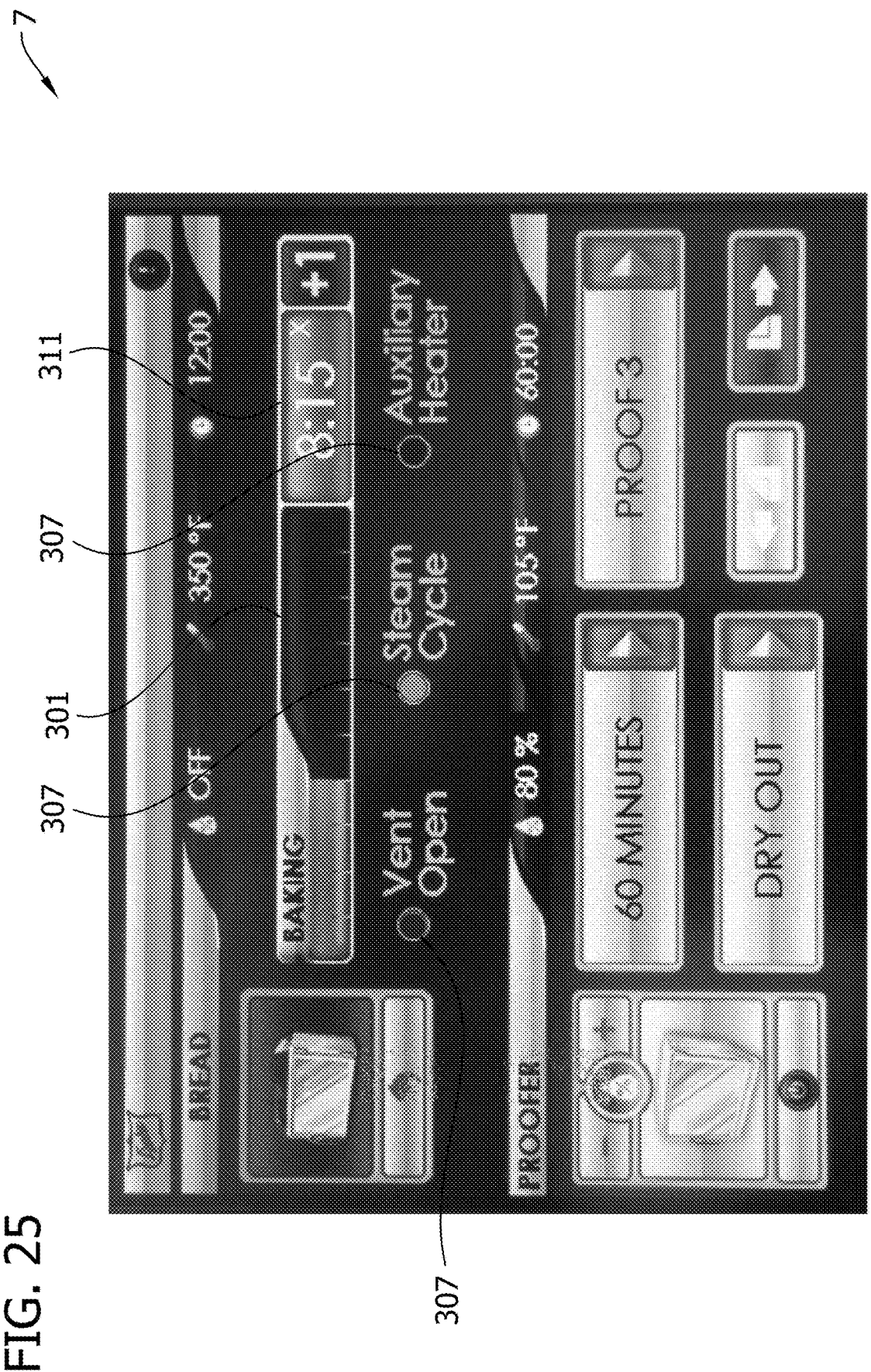
Figure 26:
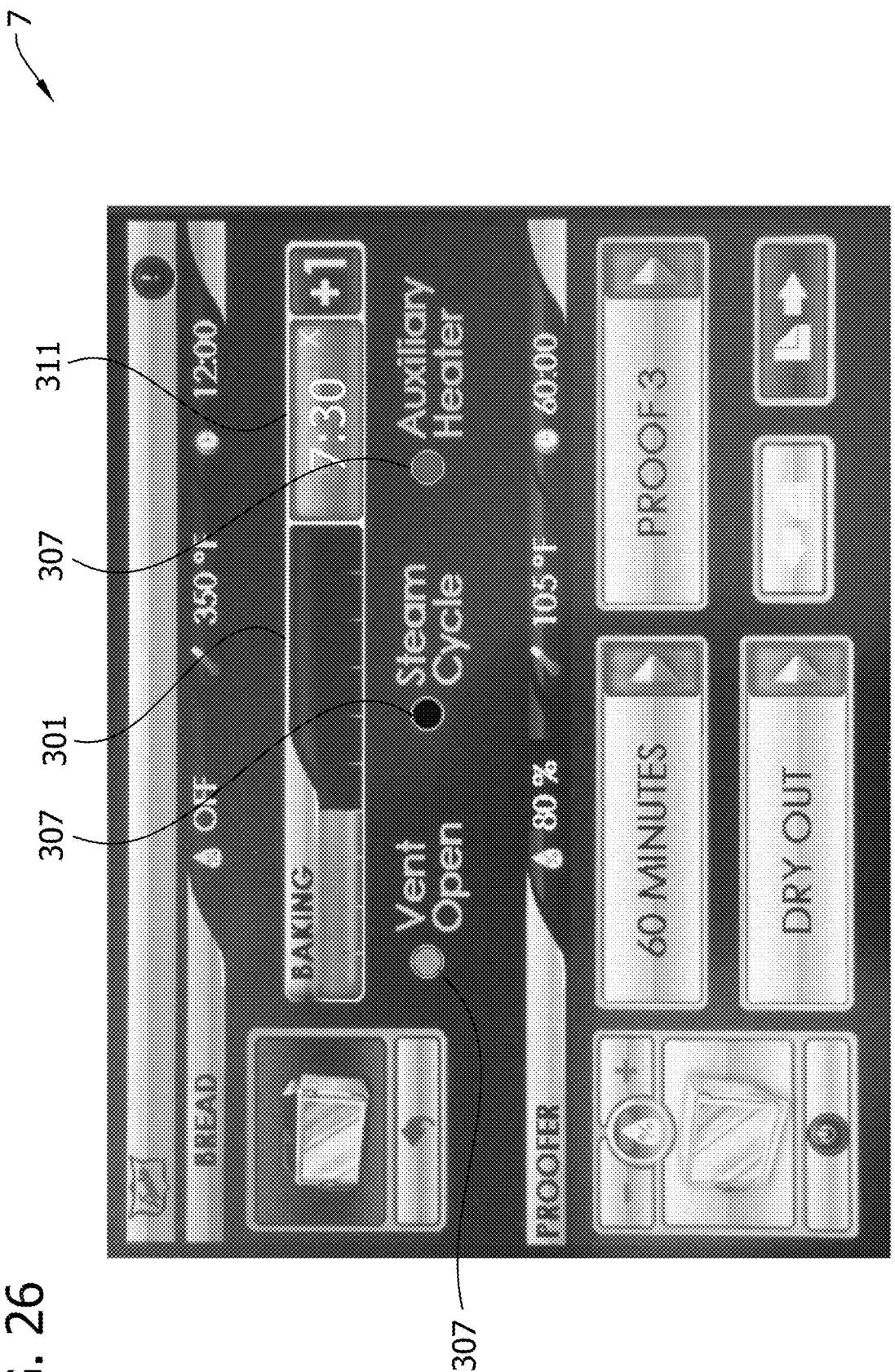
Figure 27:
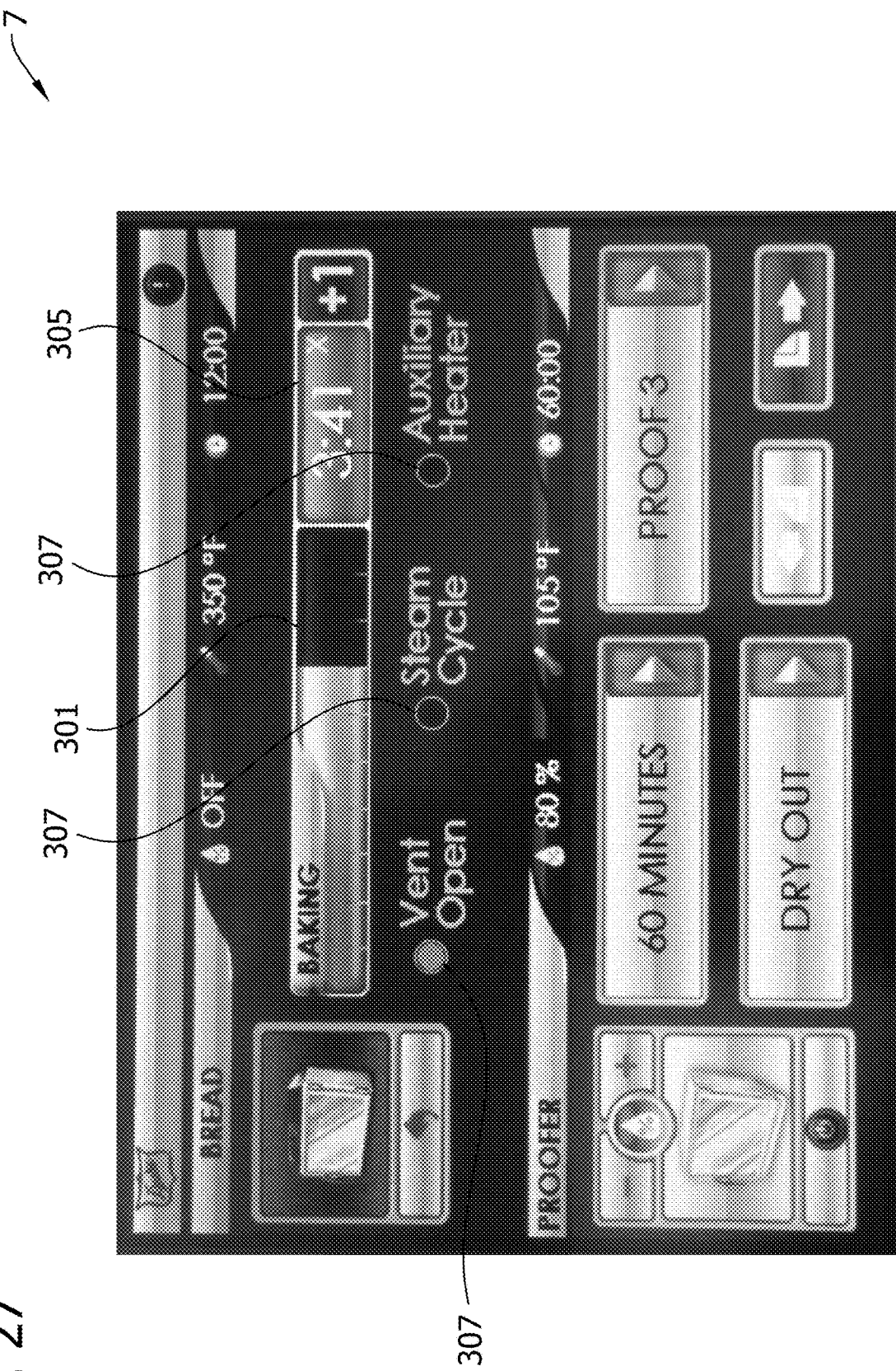
Figure 28:

At the end of the Proof recipe, the chained Bread (bake) recipe will begin automatically, and the Bread Recipe Run Screen of FIG. 21 will be shown. If the Bread recipe were not chained to start automatically, the user could navigate to the Bread Recipe Ready Screen shown in FIG. 20 and press the start actuator 305 to initiate the Bread recipe. As the Bread recipe runs, the time bar 301 and countdown timer 311 will be continuously updated to indicate the passage of recipe time, and the operational status indicators 307 will be lit and unlit based on the status of the respective parameters or food preparation environment control devices. Between countdown times 12:00 and 11:00 (e.g., at countdown time 11:45 as shown in FIG. 21), the Vent Open operational status indicator 307 will be illuminated because the flue valve 115 will be open during the pre-bake before the steam cycle. Between countdown times 11:00 and 10:30 (e.g., at countdown time 10:50 as shown in FIG. 22), the Steam Cycle operational status indicator 307 will be illuminated to show the steam cycle has begun. The status indicator 307 will be illuminated in blue to indicate delay before injecting steam. The blower 61 and heating system 71 may be de-energized at the beginning of the steam cycle (i.e., at the beginning of the Steam Delay stage). Desirably, this provides the blower 61 with sufficient time to "spin down" or stop rotating before steam injection begins. The Vent Open operational status indicator 307 is still illuminated. Between countdown times 10:30 and 10:00 (e.g., at countdown time 10:02 shown in FIG. 23), the Vent Open operational status indicator 307 will be dark indicating the flue valve 115 is closed. The flue valve 115 is closed before steam injection so steam is not lost out of the flue when it is injected into the chamber. The Steam Cycle operational status indicator 307 is still illuminated in blue to indicate delay before steam injection. Presumably, the blower 61 has stopped or almost stopped spinning by now. Between countdown times 10:00 and 8:30 (e.g., at countdown time 9:30 as shown in FIG. 24), the Vent Open operational status indicator 307 will remain dark, and the Steam Cycle operational status indicator will be illuminated in yellow to indicate steam is being injected into the chamber 11. The yellow color corresponds to the yellow color indicator 231 next to the Steam On Time parameter label on the Bread Recipe Program Screen (see FIG. 15). The blower 61 and heating system 71 may remain off, or they may be pulsed. For example, the blower 61 may be pulsed to provide minimal gas circulation in the chamber 11 to cause steam in the chamber to flow into contact with the dough. Between countdown times 8:30 and 7:30 (e.g., at countdown time 8:15 as shown in FIG. 25), the Steam Cycle operational status indicator 307 will be illuminated in blue to indicate the steam injection has ended. The Vent Open operational status indicator 307 will remain dark until the end of the Vent Close Time (i.e., at countdown time 7:30). The flue valve 115 may be kept closed during this time to provide the injected steam with additional time to saturate the chamber 11 and contact the dough. At the end of the steam cycle (i.e., at countdown time 7:30), the blower 61 and heating system 71 may re-energize to bring the temperature in the chamber 11 back to the Recipe Set Point for the remainder of the recipe time. As shown in FIG. 26, the Auxiliary Heater operational status indicator 307 may be illuminated red for a period of time after the end of the steam cycle indicating that the auxiliary heater 75 is being used to assist the primary heater 73 in re-establishing the Recipe Set Point. The auxiliary heater 75 will be operated at the programmed Aux Heat Duty Cycle. After the Recipe Set Point is achieved again in the chamber 11 (e.g., by countdown time 3:41 as shown in FIG. 27), the auxiliary heater 75 may be turned off, as indicated by the Auxiliary Heater operational status indicator 307 being dark. The blower 61 and heating system 71 operate for the remainder of the countdown time to maintain the Recipe Set Point temperature. At the end of the recipe, the time bar 301 has timed out, the countdown timer 311 shows 0:00, and an alarm may sound.

Figure 29:
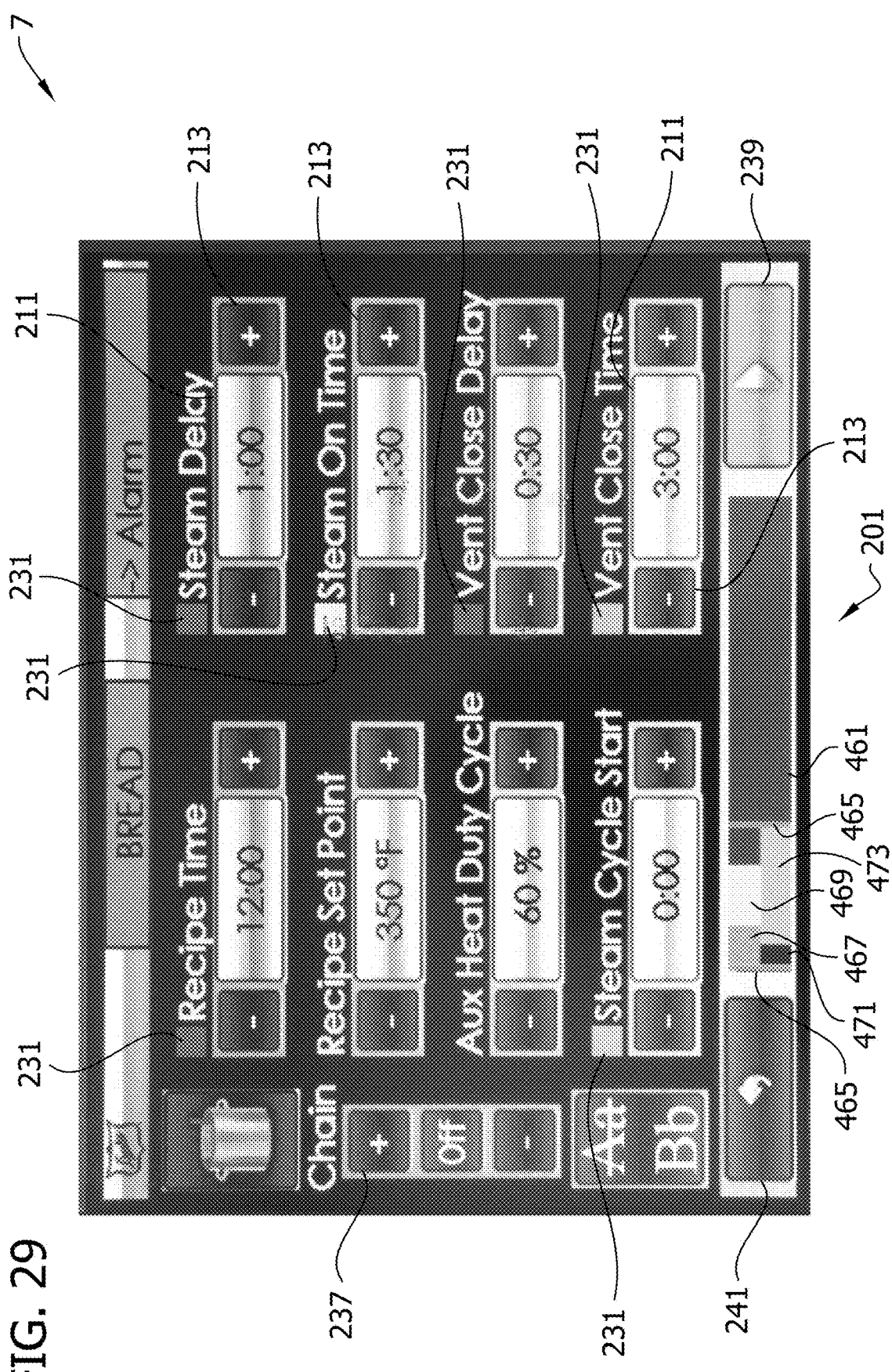
FIG. 29 is a photograph of a screenshot of the user interface showing the bread recipe program screen with an alternative recipe.
Figure 30:
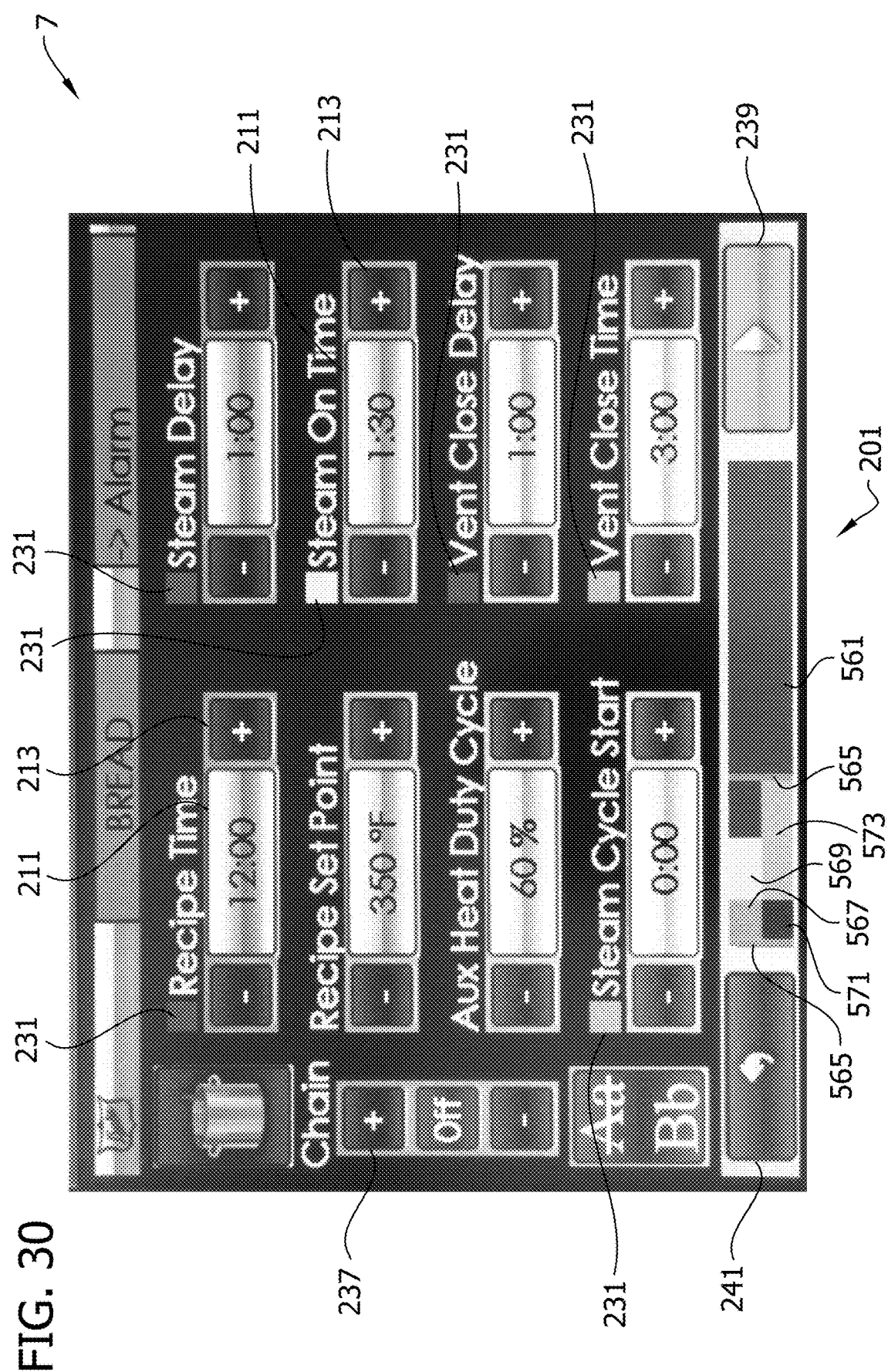
FIG. 30 is a photograph of a screenshot of the user interface showing the bread recipe program screen with another alternative recipe.

FIGS. 29 and 30 illustrate alternative embodiments of Bread (Bake) recipes and corresponding graphical representations 461, 561. The recipe of FIG. 29 includes similar parameters as the Bread recipe described above, except for the Steam Cycle Start parameter is 0:00, meaning the steam cycle will start at the beginning of the recipe rather than after a delay. Like the graphical representation 261, this graphical representation 461 includes vertically extending orange bars 465 designating the steam cycle, a dark green bar 467 indicating the Steam Delay, a yellow bar 469 designating the Steam On Time, a blue bar 471 designating the Vent Close Delay, and a light green bar 473 designating the Vent Close Time. The recipe of FIG. 30 includes similar parameters as the Bread recipe described above, except there is no delay before the start of the steam cycle, and the Steam Delay and Vent Close Delay parameters have the same values such that the steam injection begins at the same time as the flue valve 115 closes. The graphical representation 561 includes vertically extending orange bars 565 designating the steam cycle, a dark green bar 567 indicating the Steam Delay, a yellow bar 569 designating the Steam On Time, a blue bar 571 designating the Vent Close Delay, and a light green bar 573 designating the Vent Close Time. Other recipes may be used without departing from the scope of the present invention. For example, the flue valve 115 may not be closed until after steam injection begins. It will be understood that the user interface permits custom tailoring of the respective variables such that recipes can be programmed by controlling parameters (e.g., operational status of different food preparation environment control devices) independently from each other.

It will be appreciated that the retard, proof, and bake recipes described above are provided by way of example without limitation. Other recipes may be used without departing from the scope of the present invention. For example, the storage medium 165 may include instructions for executing any one of the examples below or combinations thereof. A hold recipe may be used to hold dough in a frozen or slacked state before a retard recipe. The oven 1 may be programmed for holding food such as grilled chicken, fried chicken, hamburger patties, etc. in a cooked state prior to serving. The oven 1 may be programmed to execute a retard recipe in which the steam injection system 91 is used (e.g., delivers a small volume of steam) to introduce moisture into the chamber 11 to assist in the retard process. A retard recipe may be chained directly to a bake recipe such that the oven executes a bake recipe automatically after executing a retard recipe (no intermediate proof recipe). The refrigeration system 141 may be used in a bake recipe. For example, the refrigeration system 141 may be used at or near the end of a bake recipe to rapidly cool the chamber 11 so that less heat emits from the oven when opened by a user and/or so that the baked bread cools more rapidly and can be served for consumption more quickly. The active venting flue fan 113 and/or the refrigeration system 141 may be used at or near the end of a bake recipe and/or between a bake recipe and a proof recipe for rapidly cooling the chamber 11. Retard, proof, and/or bake recipes may include different temperature set points at various times of the recipe.

The following 60 minute retard recipes, which the storage medium 15 may include instructions for executing, are provided as additional examples, including various stages listed in order of execution: 1) 20 minutes at 35 degrees F., 20 minutes at 45 degrees F., and 20 minutes at 55 degrees F.; 2) 20 minutes at 65 degrees F., 20 minutes at 60 degrees F., and 20 minutes at 50 degrees F.; 3) 10 minutes at 100 degrees F., 20 minutes at 60 degrees F., and 30 minutes at 50 degrees F.; 4) 20 minutes at 100 degrees F., 20 minutes at 40 degrees F., and 20 minutes at 65 degrees F.; and 5) 20 minutes at 40 degrees F., 20 minutes at 100 degrees F., and 20 minutes at 50 degrees F. Accordingly, the oven 1 may be programmed with retard recipes in which there are multiple stages including differently programmed parameters, in which multiple stages include different durations, in which not only the refrigeration system but also the heating system is used, in which the recipe set point temperature increases over the recipe duration, in which the recipe set point temperature decreases over the recipe duration, in which the recipe set point temperature increases then decreases over the recipe duration, and/or in which the recipe set point temperature decreases then increases over the recipe duration. Desirably, at the end of a retard recipe, the dough is about 50 to 55 degrees F. It may be desirable to heat the dough for a duration of the retard recipe to decrease the time required to bring the dough to such a temperature, or to bring the dough to such a temperature more evenly (i.e., inside and out). It will be appreciated that the 60 minute retard recipe time is provided as an example without limitation. The recipe times may be longer or shorter without departing from the scope of the present invention.

In an aspect of the present invention, the oven 1 may be programmed to provide a user with a warning indication that the end of a recipe is upcoming. The warning indication may be an audio (e.g., an alarm such as a chirp or beep) and/or visual (e.g., flash of the lights 83 inside the chamber 11) indication. For example, the storage medium 165 may include instructions to provide a warning indication when there is 5, 4, 3, 2, and/or 1, etc. minutes remaining on a given recipe (e.g., retard, proof, or bake recipe). This may be useful to remind a user to check on the performance of a recipe while it is being executed and to prompt the user to determine whether the recipe should be altered before it ends. For example, as shown in FIGS. 17, 19, and 21, the run screens for the retard, proof, and bake recipes each include, to the right of the countdown timer, a "plus one minute" actuator represented by "+1" outlined in blue. If a user notices that a certain execution of a recipe could benefit from additional time (e.g., bread not fully retarded, proofed, or baked), the user can press the "+1" actuator to lengthen the recipe in increments of one minute per press of the actuator. The warning indicator may be particularly helpful when recipes are chained together and the user would like to modify (e.g., lengthen) the recipe being executed before the control system automatically starts the next recipe. The next recipe may include significantly different parameters (e.g., temperature, humidity, etc.) such that after the next recipe starts, it would be difficult for the user to quickly recreate the conditions in the chamber used for the previous recipe.

It will be appreciated that food preparation apparatus such as the oven 1 described herein may be used for programming and testing new food preparation recipes. For example, the oven 1 may be used to program retarding, proofing, and/or baking recipes thought to impart desirable characteristics (e.g., taste, texture, color) on baked bread. The graphic representation of the recipes provides convenient understanding of how the programmed relate to each other as a function of time and how modification of various parameters affects the recipe as a whole. The oven can be used to execute the programmed recipes, and if satisfactory, the tested recipes can be used to program production ovens. For example, the tested recipes may be copied from the tangible memory 165 to a USB flash drive (or other portable tangible memory) for uploading to other ovens (e.g., located in remote food service stores).

It will be understood that the user interface 7 disclosed herein has broader applicability than merely for food preparation apparatus such as the oven discussed herein. For example, the user interface 7 may be used in other recipe-implementing apparatus in which it may be desirable to display a graphic representation of a recipe with respect to time. For example without limitation, such a user interface 7 may be used in conjunction with a dish washer (ware washer), clothes washer, food holding cabinet, etc. Recipes having multiple functions and/or multiple stages can be shown graphically with respect to time to facilitate user comprehension of the recipes as programmed. Recipe-implementing apparatus other than ovens or food preparation apparatus may be used without departing from the scope of the present invention.

The Title, Field of Invention, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field of Invention, and Background are not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A food preparation apparatus comprising:
a food preparation chamber,
at least one controller,
multiple food preparation environment control devices responsive to the at least one controller to adjust a food preparation environment in the food preparation chamber, and
a user interface permitting a user to program a food preparation recipe to be executed by the food preparation apparatus such that the controller controls the food preparation environment control devices according to the recipe, the user interface including:
a user input for programming the recipe, the user input being configured for receiving at least one parameter for controlling at least one of the food preparation environment control devices, the at least one parameter defining an operational state of the at least one food preparation environment control device, and
a graphical display operatively connected to the user input and configured to, before execution of the programmed recipe, display as a graph representations of operational states of the multiple food preparation environment control devices with respect to time according to the programmed recipe.

2. The food preparation apparatus as set forth in claim 1, wherein the user input includes at least one actuator for receiving the at least one parameter, and the user interface further comprises a recipe program screen, the at least one actuator and the graphical representation being shown on the recipe program screen at the same time.

3. The food preparation apparatus as set forth in claim 1, wherein the user interface comprises a touch screen including the user input and the graphical display.

4. The food preparation apparatus as set forth in claim 1, wherein the user input includes a parameter value display and an associated actuator for adjusting a parameter value displayed on the parameter value display.

5. The food preparation apparatus as set forth in claim 1, wherein the graphical display updates the graph in real time according to at least one parameter received by the user input.

6. The food preparation apparatus as set forth in claim 1, wherein the user input is configured for receiving multiple parameters for controlling the at least one food preparation environment control device, the user input including color indicators associated with respective parameters, and the graphical display displaying on the graph representations of operational states associated with the parameters using color corresponding to respective color indicators.

7. The food preparation apparatus as set forth in claim 1, wherein the operational states are representative of whether the food preparation environment control devices are active or inactive.

8. The food preparation apparatus as set forth in claim 1, wherein the user input permits the user to input parameters associated with different functions of the food preparation apparatus to be performed during the recipe, and the graphical display displays separately on the graph representations of operational states of food preparation environment control devices of the food preparation apparatus associated with different functions of the food preparation apparatus.

9. The food preparation apparatus as set forth in claim 1, wherein the user input permits the user to input parameters associated with humidification and venting functions of the food preparation apparatus to be performed during the recipe, and the graphical display displays separately on the graph representations of operational states of the food preparation environment control devices of the food preparation apparatus associated with the humidification and venting functions.

10. The food preparation apparatus as set forth in claim 1, wherein the graphical display displays on the graph overlapping durations of operational states of the food preparation environment control devices.

11. The food preparation apparatus as set forth in claim 1, wherein the graph displayed by the graphical display includes a bar graph including representations of operational states of the food preparation environment control devices with respect to time.

12. The food preparation apparatus as set forth in claim 1, further comprising a recipe run screen, the recipe run screen including a countdown time display and an operational status indicator, the countdown time display counting down recipe time, and the operational status indicator indicating an operational state of at least one food preparation environment control device corresponding to the countdown time displayed by the countdown time display.

13. The food preparation apparatus as set forth in claim 12, wherein the operational status indicator has different states representing respective active and inactive states of the food preparation environment control device.

14. The food preparation apparatus as set forth in claim 12, wherein the user input includes a color indicator associated with the at least one parameter, and wherein the operational status indicator of the run screen is illuminated in a color corresponding to the color indicator of the user input for indicating an operational state of the associated food preparation environment control device.

15. The food preparation apparatus as set forth in claim 1, wherein the representations are arranged in the graph according to respective start times of the operational states of the multiple food preparation environment control devices with respect to time.

16. The food preparation apparatus as set forth in claim 15, wherein the representations each have a size in the graph according to respective duration times of the operational states of the multiple food preparation environment control devices.

17. The food preparation apparatus as set forth in claim 11, wherein the bar graph displayed by the graphical display includes a horizontal bar graph including representations of operational states of the food preparation environment control devices with respect to time.

18. The food preparation apparatus as set forth in claim 1, wherein each representation visually indicates a start time and an end time of the operational state of the corresponding one of the multiple food preparation environment control devices.

19. The food preparation apparatus as set forth in claim 1, wherein the multiple food preparation environment control devices include a heating system and the representations include a heating representation of the operational state of the heating system, the heating representation visually indicating a start time when the heating system is activated and an end time when the heating system is deactivated.

20. The food preparation apparatus as set forth in claim 19, wherein the multiple food preparation environment control devices include a humidification system and the representations include a humidification representation of the operational state of the humidification system, the humidification representation visually indicating a start time when the humidification system is activated and an end time when the humidification system is deactivated.

21. The food preparation apparatus as set forth in claim 1, wherein the representations include a first representation and a second representation, each of the first and second representations visually indicating a start time and an end time of the operational states of corresponding two of the multiple food preparation environment control devices, the graphical display configured to arrange the first and second representations on the graph with respect to the time to visually indicate the start times of the operational states of said two multiple food preparation environment control devices with respect to one another and to visually indicate the end times of the operational states of said two multiple food preparation environment control devices with respect to one another.

* * * * *